(12) United States Patent
Whittle et al.

(10) Patent No.: US 7,890,961 B2
(45) Date of Patent: Feb. 15, 2011

(54) METHOD AND APPARATUS FOR PROVIDING DESKTOP APPLICATION FUNCTIONALITY IN A CLIENT/SERVER ARCHITECTURE

(75) Inventors: Derrick W. Whittle, Marietta, GA (US); Vincent L. Sollicito, Marietta, GA (US); Edward F. Seitz, Atlanta, GA (US)

(73) Assignee: Yahoo! Inc., Sunnyvale, CA (US)

( * ) Notice: Subject to any disclaimer, the term of this patent is extended or adjusted under 35 U.S.C. 154(b) by 45 days.

(21) Appl. No.: 10/652,607

(22) Filed: Aug. 29, 2003

(65) Prior Publication Data

US 2005/0050547 A1 Mar. 3, 2005

(51) Int. Cl.
G06F 9/44 (2006.01)
G06F 15/16 (2006.01)
(52) U.S. Cl. .................. 719/320; 709/203; 715/234
(58) Field of Classification Search ............. 719/310, 719/320; 709/203, 204, 224; 707/203; 715/234
See application file for complete search history.

(56) References Cited

U.S. PATENT DOCUMENTS

| | | | |
|---|---|---|---|
| 4,663,615 A | | 5/1987 | Hernandez et al. |
| 5,544,288 A | | 8/1996 | Morgan et al. |
| 5,546,521 A | | 8/1996 | Martinez |
| 5,655,094 A | | 8/1997 | Cline et al. |
| 5,734,835 A | | 3/1998 | Selker |
| 5,754,755 A | * | 5/1998 | Smith, Jr. ............... 714/38 |
| 5,801,703 A | | 9/1998 | Bowden et al. |
| 5,805,884 A | * | 9/1998 | Sitbon et al. ............. 719/320 |
| 5,878,213 A | | 3/1999 | Bittinger et al. |
| 5,897,644 A | | 4/1999 | Nielsen |
| 5,933,140 A | | 8/1999 | Strahorn et al. |
| 5,956,709 A | * | 9/1999 | Xue ........................ 1/1 |
| 6,078,935 A | | 6/2000 | Nielsen |
| 6,175,563 B1 | | 1/2001 | Miloslavsky |
| 6,216,141 B1 | | 4/2001 | Straub et al. |
| 6,259,445 B1 | | 7/2001 | Hennum et al. |
| 6,272,485 B1 | * | 8/2001 | Sragner ................... 707/1 |
| 6,300,947 B1 | | 10/2001 | Kanevsky |
| 6,327,608 B1 | * | 12/2001 | Dillingham ............. 709/203 |
| 6,405,221 B1 | | 6/2002 | Levine et al. |
| 6,570,594 B1 | | 5/2003 | Wagner |
| 6,684,385 B1 | | 1/2004 | Bailey et al. |
| 6,701,513 B1 | | 3/2004 | Bailey |
| 6,744,867 B1 | * | 6/2004 | Chin et al. ............. 379/142.01 |
| 6,748,418 B1 | * | 6/2004 | Yoshida et al. ......... 709/204 |
| 6,750,884 B1 | | 6/2004 | Steigerwald et al. |
| 6,792,459 B2 | * | 9/2004 | Elnozahy et al. ........ 709/224 |

(Continued)

OTHER PUBLICATIONS

Kaasinen et al "Two Approaches to Bringing Internet Services to WAP Devices" Computer Networks 2000, pp. 231-246.*

(Continued)

Primary Examiner—Van H Nguyen

(57) ABSTRACT

A method and apparatus for providing functionalities of desktop applications using a client/server architecture is provided. Data including a user's preferences and a script are provided to a client system. The script is configured to define a function of a control. The function allows the control to perform an operation using the received data. The use of the received data and script permits a user to have a desired interface and environment regardless of the native functionalities of the client system.

90 Claims, 15 Drawing Sheets

U.S. PATENT DOCUMENTS

| | | | |
|---|---|---|---|
| 6,828,988 | B2 | 12/2004 | Hudson et al. |
| 6,868,292 | B2 * | 3/2005 | Ficco et al. .................. 700/19 |
| 6,944,660 | B2 * | 9/2005 | Eshghi et al. ............... 709/224 |
| 6,961,929 | B1 * | 11/2005 | Pelegri-Llopart et al. ... 717/136 |
| 7,051,119 | B2 * | 5/2006 | Shafron et al. .............. 709/248 |
| 7,107,530 | B2 | 9/2006 | Blakely et al. |
| 7,165,215 | B2 | 1/2007 | Tunning |
| 7,240,283 | B1 * | 7/2007 | Paila et al. .................. 715/205 |
| 7,325,204 | B2 | 1/2008 | Rogers |
| 7,395,500 | B2 | 7/2008 | Whittle et al. |
| 2001/0056448 | A1 | 12/2001 | Takeda |
| 2002/0116407 | A1 * | 8/2002 | Negishi et al. .............. 707/203 |
| 2003/0033448 | A1 * | 2/2003 | Kieffer ........................ 719/331 |
| 2003/0058281 | A1 | 3/2003 | Kepros et al. |
| 2003/0061386 | A1 * | 3/2003 | Brown et al. ................ 709/246 |
| 2004/0004632 | A1 | 1/2004 | Knight et al. |
| 2004/0199577 | A1 * | 10/2004 | Burd et al. .................. 709/203 |
| 2004/0212640 | A1 | 10/2004 | Mann et al. |
| 2005/0028107 | A1 | 2/2005 | Gomes et al. |
| 2007/0022155 | A1 * | 1/2007 | Owens et al. ............... 709/202 |
| 2007/0250572 | A1 * | 10/2007 | Paila et al. .................. 709/204 |
| 2007/0300244 | A1 * | 12/2007 | Kieffer ........................ 719/331 |

OTHER PUBLICATIONS

Edward et al. "Reusing Internet Explorer and the WebBrowser Control: An Array of Options," Microsoft Corporation, Jul. 30, 1998, pp. 1-7.

Horton, Ivor. (Aug. 2000), "Beginning Java2,"Wrox Press Ltd., Birmingham, UK, pp. 602-617.

International Search Report mailed Dec. 23, 2005, for PCT patent application No. PCT/US04/27872, filed Aug. 25, 2004, 2 pages.

Chang, Bay-Wei et al. (1998) "A Negotiation Architecture for Fluid Documents," UIST '98, San Francisco, CA, pp. 123-132.

MacLean, Allan et al. (May 1989) "Design Rationale: The Argument Behind the Artifact," CHI '89 Proceedings, pp. 247-252.

Zellweger, Polle T. et al. (May 1998) "Fluid Links for Informed and Incremental Link Transitions," HyperText '98, Pittsburgh, PA, May 1998, pp. 50-57.

Zellweger, Polle et al. (Apr. 2000) "The Impact of Fluid Documents on Reading and Browsing: An Observational Study," CHI 2000, The Hague, Amsterdam, Apr. 1-6, 2000, pp. 249-256.

Losavio, Marco (Jun. 5, 1999). "Correctly Set Scrollbars' Width and Height," located at <http://www.devx.com/vb2themax/Tip/18285>, visited on Aug. 27, 2007. 3 pages.

Witt et al. (2001). "Reducing Cognitive Overhead on the World Wide Web," *ACSC2002* Melbourne, Australia, pp. 311-320.

Cadiz et al. (2002). "Designing and Deploying an Information Awareness Interface," *CSCW 2002* New Orleans, LA, pp. 314-323.

Microsoft Corporation. (Oct. 1998). "Microsoft Office: Microsoft Outlook 2000 Product Enhancement guide," pp. 1-61.

* cited by examiner

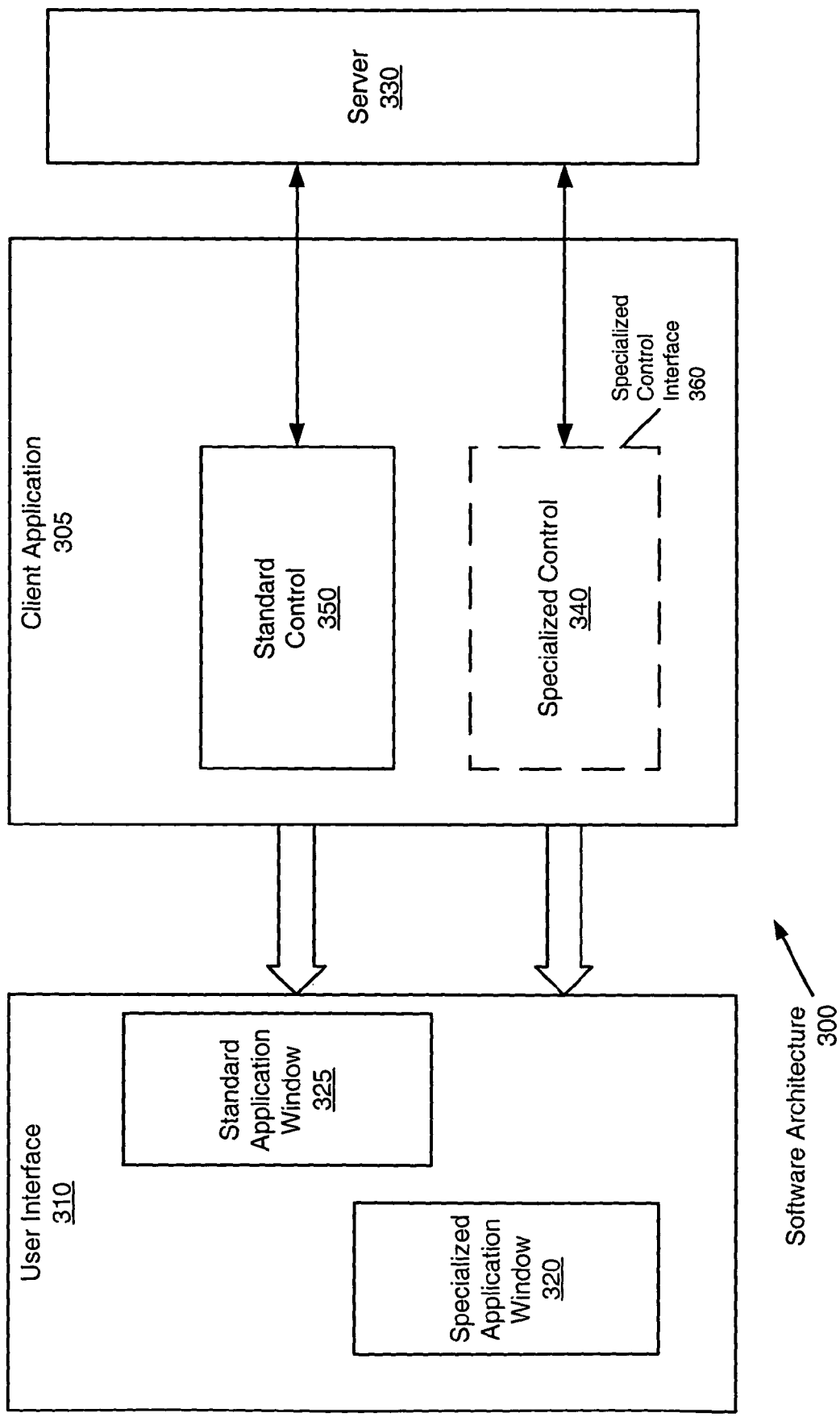

METHOD AND APPARATUS FOR PROVIDING DESKTOP APPLICATION FUNCTIONALITY IN A CLIENT/SERVER ARCHITECTURE

BACKGROUND OF THE INVENTION

1. Field of the Invention

This invention relates to the field of client/server architecture, and more particularly relates to a method and apparatus for providing desktop application functionality in a client/server architecture.

2. Description of the Related Art

With the advent of the Internet and, more importantly, the World-Wide Web (WWW, or web), users of computer systems have been afforded a wide array of functionalities, accessible from almost any location. This "portability" is provided by any number of mechanisms, including Internet access at home and at work; public terminals; wireless technology, such as cellular, IEEE 802.11 standards (often referred to as "Wi-Fi"), satellite communications and the like; and other such mechanisms. The basis for this portability is the client/server architecture, in which the user is able to access information on the server from any client that is capable of accessing the server. Thus, the user is able to access, for example, a given set of programs on a server from a client in communication therewith.

The ability to access such functionality is simplified when using the web or other client/server environment, because the only required software on the client side is a client such as a web browser. For example, using a browser, the user is able to view content such as web pages generated by a given application. This allows the application to present the requisite information as would be the case if the application were operating on the user's computer (also termed "on the desktop"), without actually having to install that application on the their computer. Such a "generic client" approach, obviously, lends itself to the portability aspect that makes such a paradigm so attractive.

In fact, the number of people using computer systems in their daily lives has increased dramatically with the growth of the Internet and the web, who have grown accustomed to accessing virtually unlimited information stored by computer systems all over the world. As the sophistication of computer users increases, user expectations of the types of user interfaces and functionality that should be provided by software applications also increase.

Many software development environments for desktop and network applications enable a developer to assemble an application using multiple components that provide different types of functionality. Components provide the capability for an application to provide rich, fully-featured user interfaces, including functionality for windows, buttons, scrollbars, and so on. A component can be re-used by many applications within a computer or among computers in a network. The application provides an environment, also referred to as a context, in which the component runs.

A component can include display code and functional code, where the display code can display a visual portion of a user interface and the functional code can respond to a user action taken with reference to the visual portion. For example, a component's display code can display a button in a user interface, and the component's functional code can specify a function to perform when a user performs an action with reference to the button. For example, the user can point a cursor to the button using a mouse or other pointing device and click on the button, which causes the functional code to be performed. A component is not, however, required to include display code or display a visual portion of the user interface. When a component does not display a visual portion of the user interface, the component is sometimes referred to as being "invisible."

Unfortunately, the functionality to implement components is not always easily achieved using the technology employed in client/server environments such as the web. For example, browsers provide information (content) in the form of a web page, which is produced by interpreting a text document encoded using a language specially developed for such applications. In the web environment, Hypertext Markup Language (HTML) is such a language. Thus, for example, a single HTML document cannot easily provide all of the information needed to provide a sophisticated user interface in the form of a web page. Because of the limitations of HTML, web application developers face significant challenges in providing user interfaces that can access the wealth of information available via the Internet using web technology and yet provide the sophisticated features meeting users' expectations.

Moreover, generating and serving content, especially that which needs to be populated with data from other sources, is often quite slow, particularly when compared to desktop applications. As a result, users of such systems are often found to prefer desktop applications over web-based applications. Certainly, the greater the delay in operations experienced with a web-based application, the more preferable a user would find using a corresponding desktop application. The greater the delay, the stronger the user's preference for the desktop application, generally.

This is especially true of applications (and functions thereof) in which the data would be immediately available, in the case of a desktop application. For example, many desktop applications automatically fill certain data-entry fields on various of their screens. This is a convenient and time saving feature that most users find desirable. However, when providing such functionality in a web-based application, some amount of delay in filling such fields is inevitable, as a result of the delays inherent in transporting information over the network. If the delays are substantial, the user's experience in using the given application is negatively impacted.

One solution is keeping the data available using a "cookie," which is a message sent to a web browser by a web server, which the browser stores in, for example, a text file. Typically, information from such a cookie is then sent back to the server in the form of a message, each time the browser requests a page from the server, to identify the user and, potentially, to give the server information regarding the user. As will be appreciated, cookies can also be used to store information on a client computer. However, such an approach must contend with a number of shortcomings. Moreover, leaving such information on a public computer may not be acceptable, and so require the user to delete such cookies after each use of the application.

Another approach is to simply download the entire store of requisite data at the time the content, such as a web page, is downloaded (served) to the client. This would, typically, include the entire store of data that might be used by/presented to the user. However, this must be done each time any such information is needed, consuming valuable network resources and, as noted earlier with regard to such delays, negatively impacting the user's experience. As will also be appreciated, sending the full complement of data can also slow, or even crash, the browser software running on the client, once again resulting in a poor user experience. Thus, the poor performance typically associated with web-based solutions stands as an obstacle to adoption.

What is therefore needed is a technique that allows a web-based application to provide the functionality of a desktop application with the advantages of a client/server architecture. Such functionality should be provided to the user in a fast and efficient manner, while offering the advantages of web-based applications, including portability, uniformity and the like.

SUMMARY

The present invention provides a method and apparatus that addresses the foregoing limitations by supporting the requisite data and functionality on the server side, and allowing quick, efficient and extensible access to this server-based data and functionality. Moreover, by minimizing the transfer of information over a network employing the present invention this performance is provided without adversely impacting network resources or performance.

This performance aspect is important for a number of reasons, not the least of which is user adoption of systems employing the present invention. A key deterrent to adoption is poor performance, and even exceptional functionality without acceptable performance can be perceived as little more attractive than not having the functionality in the first place. Other advantages of the present invention stem from its use of a client/server architecture: support for mobility, ubiquitous access, uniform interface and environment (regardless of the client being used) and simple application software on the client side, among others. A practical example is the use of a web browser in accessing a server, or group of servers, supporting such server-based functionality.

The present invention achieves such advantages by maintaining data and functionality on one or more servers, and allowing access to this data and functionality from any of a number of clients. By providing such data and functionality locally, in the manner of a desktop application, while maintaining such data and functionality remotely, the present invention meets user expectations with regard to speed and the functions offered, while also meeting their needs with regard to the mobility they desire. The present invention achieves these objectives by maintaining data locally and efficiently synchronizing that data with data stored remotely. This allows users fast, efficient access to their data, while maintaining their ability to access their data from any location. Similarly, the functionality presented to the user, being server-based, allows the provision of a familiar interface and environment to the user, regardless of the client employed by the user.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and numerous objects, features, and advantages made apparent to those skilled in the art by referencing the accompanying drawings.

FIG. 3 is a block diagram illustrating an example of a software architecture according to embodiments of the present invention in greater detail.

The use of the same reference symbols in different drawings indicates similar or identical items.

DETAILED DESCRIPTION OF THE INVENTION

Figure 1A:
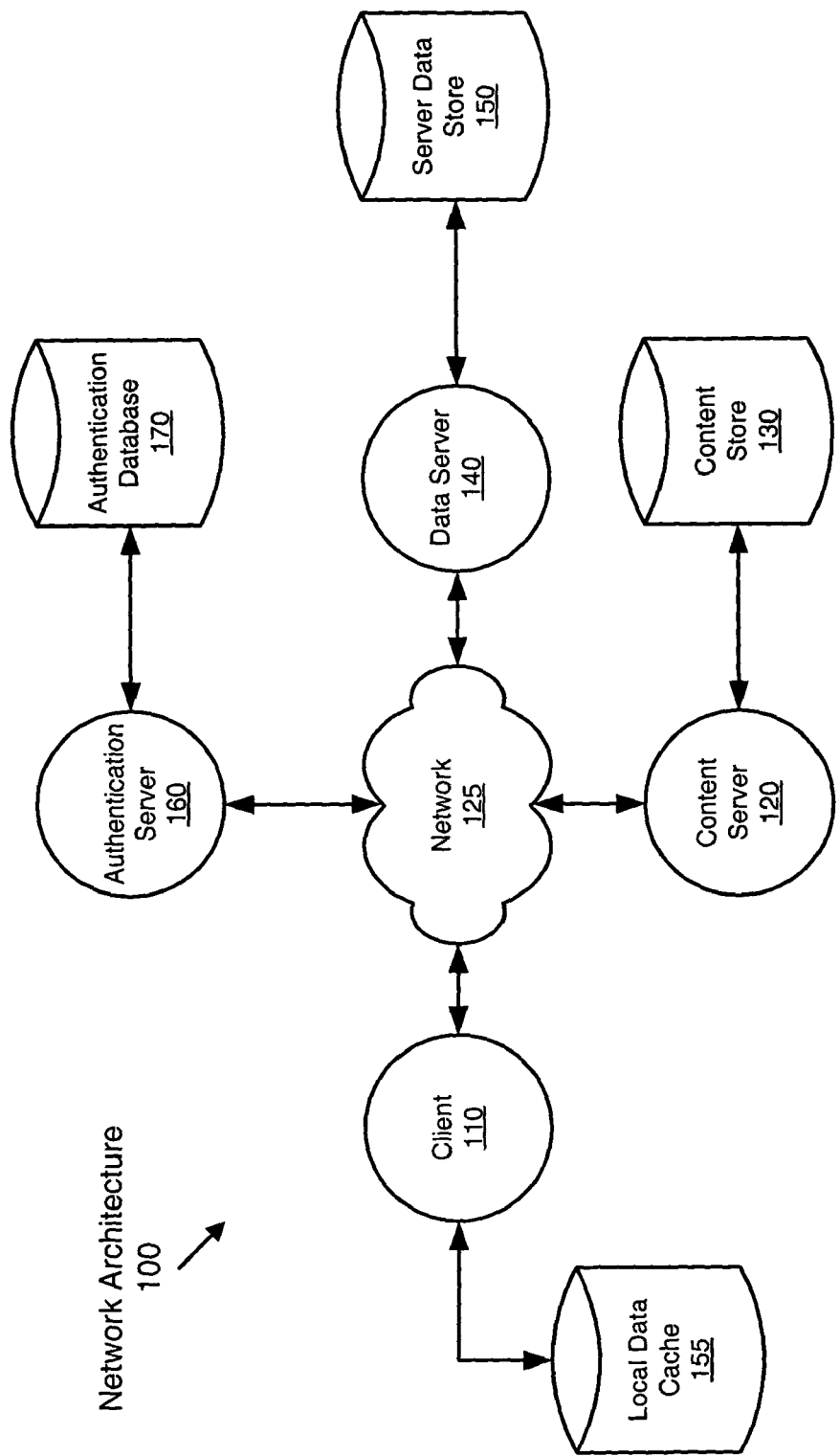
FIG. 1A is a diagram illustrating a network architecture according to embodiments of the present invention.

The following is intended to provide a detailed description of an example of the invention and should not be taken to be limiting of the invention itself. Rather, any number of variations may fall within the scope of the invention which is defined in the claims following the description.

Introduction

The present invention provides a method and system that provides for the provision of functionality typically associated with a desktop application, using a client/server architecture such as a web-based application accessing and presenting server-based functionality on a client system, in a timely and efficient manner.

The goal of using a client/server architecture in providing desktop functionality is to provide a user with an experience that is not significantly different, both in terms of the functionality offered and the performance experienced by the user, while providing the advantages offered by the client/server model, such as mobility, ubiquitous access, uniform interface and environment, simple application software on the client side and the like. By desktop application, it is meant that the given application is being executed on a computing platform that is local to the user, and not on a remote computing platform, although in either case, the data processed by an application, whether a desktop application or client-side application, may reside on a remote server. Support for a "desktop application experience" in a client/server can be viewed from two perspectives: functionality and data.

From the perspective of functionality, a server-based application, such as an e-mail application, according to embodiments of the present invention provides the functions typically associated with a desktop application, such as address book, auto-fill of certain fields, and so on. Moreover, such a server-based application provides these functions with the performance typically associated with a desktop application—without the delays typically associated with client/server based systems. This is achieved in a client/server architecture by basing information on the server, including program(s) and data, and providing functionality to allow each to be quickly and easily accessed by a client. The performance provided by the present invention is important for a number of reasons, not the least of which is adoption by users. A key deterrent to adoption is poor performance, and functionality without acceptable performance can be perceived as little more attractive than not having the functionality in the first place.

This is achieved via a client/server system in which a server dynamically provides information and controls the display of the information at the client. According to embodiments of the present invention, such server-based programmatic functionality is enabled through the use of a combination of controls/scripts. The components described herein that can be used to implement the invention operate in accordance with the Component Object Model (COM), which is a standard (not a product) that defines how components interact to provide functionality. Microsoft provides a technology referred to as "ActiveX" that operates in accordance with the COM standard and provides for the implementation of components referred to as "Active X controls." Other software companies have implemented components using other technologies, but also refer to their components as "controls." It is not a requirement of the invention that the controls described herein are implemented using ActiveX or any other technology. In common practice, the term "control" is sometimes used to refer to the control software as well as to the visual portion of the user interface that is displayed by the control software. However, to clarify the terminology used herein, the control software program is referred to as a "control program," and an instantiation of an object by the control program is referred to herein as a "control instance." The visual portion displayed by the display code of the control program is referred to as a "control window." When the visible portion is a control window that includes a web page, the terms "web page" and "control window" are used interchangeably because a web page is presented within a window by default by a web browser control. For consistency, a program that is not a control, such as an application program, is referred to as a "program," and an executing version of the program is referred to as a "program instance." Thus, in one embodiment, control over the operation of the remote system (client) is achieved using an ActiveX control/JavaScript combination. This allows the server, having knowledge of data and content, to drive operations.

In operation, such an approach allows for the operation of a server-based information system such as e-mail in the manner of a client-side system without an actual client by providing one or more ActiveX controls that present the client as a local interface on the server. In fact, the client, in this mode, does not use, and may not even possess, the functionality associated with a full local interface into the server-based system. Instead, the ActiveX controls allow the client to act like a terminal attached to the server, where the server maintains sufficient functionality to allow the client's user to perform the necessary operations. This can be a reduced feature set, if necessitated by the network environment.

Such an approach provides an extensible interface on the client that can be fashioned as needed to present the information (content) from the server in the most efficient and effective manner. By implementing an interface according to the present invention, the server can be given control over what functions, of those supported by the server, that the client is allowed to perform. As new functions are added on the server, whether to the server providing content or data (should those functions be supported separately), the client can be easily updated. Thus, for example, if a new function is implemented on a server, the client receives a new JavaScript, which includes the information needed to allow the client to access that new functionality.

Returning to the example of e-mail, a server supporting e-mail functionality might offer subject information, deletion, priority indication, flagging, and to/from/cc:/bcc: information to a given client. In fact, such capabilities can be employed to implement user preferences, in which preferences information, stored on the server as preferences data, is used to control the presentation of information and functionality to the user. Alternatively, the server might allow use/display of subject, deletion and priority indication, and the client might employ only subject and deletion, and not present the use priority indication, based on the user's preferences. Thus, the server controls the functionality and information the client presents to the user.

From the perspective of the data to be presented, such data can be allowed to reside on a server through the use of a client-side information store (referred to herein as a local data cache). The client maintains synchronization with the server-side database through the use of validation information that allows the client to determine the validity of its local data cache. A local data cache, rather than a database, is employed for reasons of simplicity and security. Such a local data cache is not updated transactionally, in the manner of a database, but is updated by copying data from the data store and writing the local data cache in its entirety. This simplifies the structure of the local data cache, as well as the client and server software. It also speeds operation of reading the local data cache, one of the most common tasks in such a system, and reduces the demands on client systems by not requiring the presence of database software on such systems.

Synchronization is maintained between the local data cache and the server-side database through the maintenance of local validation information (e.g., in the client's local data cache), and comparison of that local validation information and current validation information. The client or the server, depending upon the particular implementation, can perform this comparison. The comparison may indicate that the client should request the requisite data, that the local data cache does not exist, or that some other consideration leads to the conclusion that such a request should be made. In such a case, the client sends synchronization information to a server, which can be, for example, the same server or a dedicated server, such as a data server. This synchronization information can be configured to either force the server to send the requisite data, or to indicate that the server should make a determination as to whether or not the requisite data should be sent, based on information in the synchronization information and/or other information available to the server, for example.

Thus, synchronization of the data stored in the local data cache with that stored in a data store can be controlled by the server providing the content, the client, or the server serving the requisite data. It will be appreciated that, in fact, the server providing the data can be the same server as that providing the content. By implementing such a methodology, then, a client application is able to access the data necessary to present a web-based application's content in a timely and efficient manner, from any client that has access to the requisite server(s).

Example Client/Server Network Architecture

FIG. 1A is a block diagram illustrating a network architecture 100 according to embodiments of the present invention. Within network architecture 100, a client 110 accesses a content server 120 via a network 125, in order to receive web page content from content server 120. Content server 120 serves web page content to client 110 by accessing a content store 130. Content store 130 can be, for example, a web page content store, in which content representing web pages is stored. This web page content can include, for example, fields requiring data of various types and formats. In certain situations, then, the web page content served by content server 120 is populated with such data. In these situations, the requisite data can be provided by content server 120, or served to client 110 by a data server 140, via network 125. In the latter case, as depicted in FIG. 1A, data server 140 serves data to client 110 by accessing a server data store 150. Client 110 caches the data served by data server 140 in a local data cache 155.

In order to secure access to content server 120 and data server 140 (and so, content store 130 and server data store 150), an authentication server 160 is provided. Authentication server 160 authenticates a user logging into content server 120 from client 110 via communications over network 125. The user provides login information in the process of logging into content server 120. In turn, authentication server 160 uses this login information and authentication information stored in an authentication database 170 to authenticate the user. It will be appreciated that, while such a user can be a person, the user can just as easily be a member of a user group (the members of which would log in using the same login information), or some other logical grouping of those needing access to the information made available via the servers described herein.

Thus, a user logging in to client 110 is authenticated by authentication server 160, and so gains access to content server 120 and data server 140 upon acceptance of the user's login information. Content server 120 and data server 140 also are provided access to the user's authentication information (stored in authentication database 170) via communications with authentication server 160. It will be appreciated that the content and data are distinguishable. For example, the content can be a web page (e.g., static HTML information), whereas the data might be the information displayed in fields thereof (e.g., the e-mail address or physical address info). In certain embodiments, however, the data can also include preferences information, such as preferences in configuration or in information to be displayed.

It will be appreciated that the functions depicted as being separate in FIG. 1A (serving of content, serving of data, and authentication) need not, in fact, be provided by separate computing entities. For example, the provision of content and data can be handled by a single server, from a single data store. Moreover, the messages passed between the servers and the client can be consolidated, and simply occur between the client and, for example, a single server providing all of the requisite services. It will also be appreciated that the various servers and data stores depicted in FIG. 1A are thus depicted for purposes of explanation. Each data store can be considered an integral part of its respective server, without loss of generality.

Figure 1B:
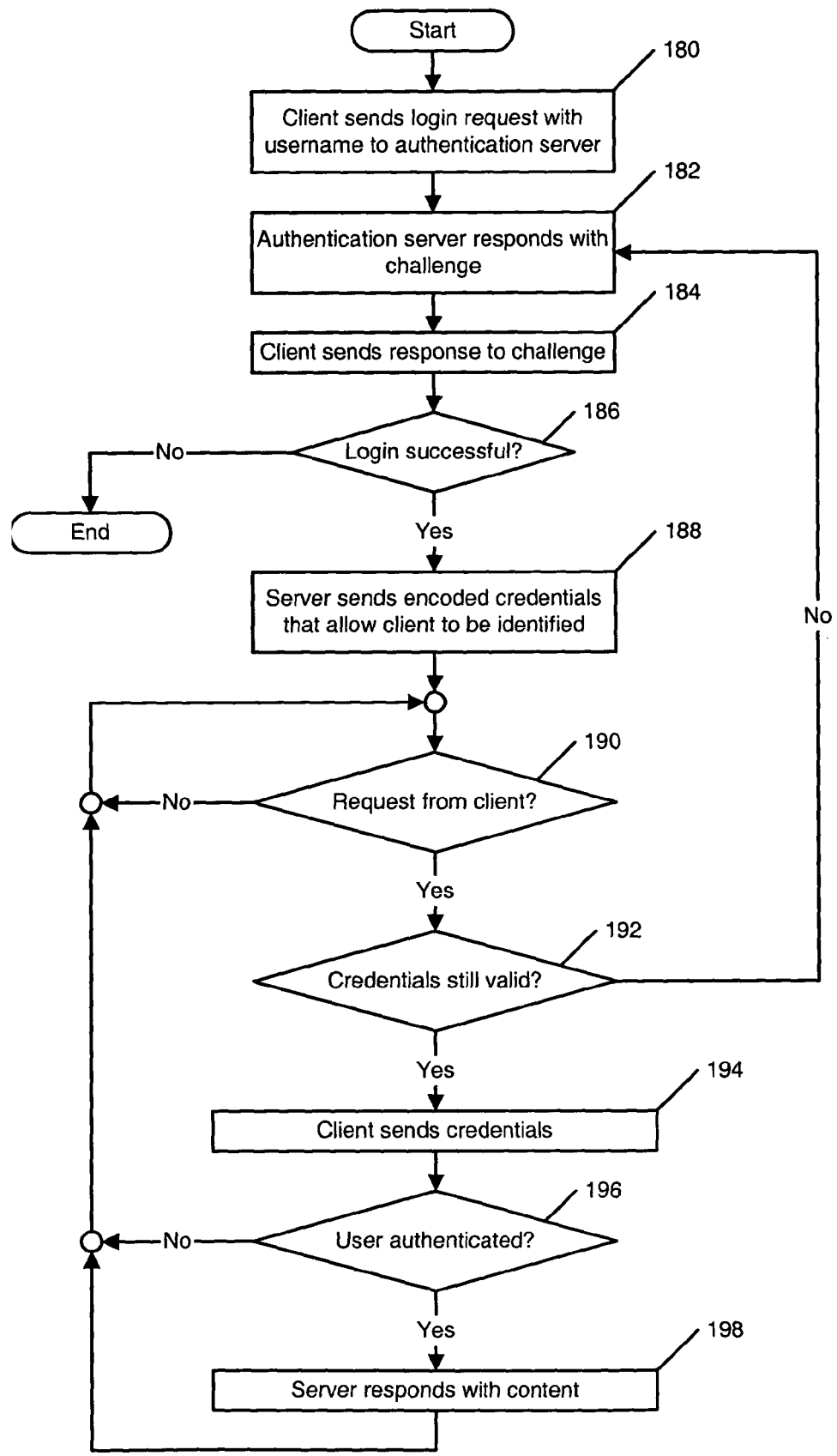
FIG. 1B is a flow diagram illustrating a process of user authentication in a network architecture according to embodiments of the present invention.

Example Processes for Providing Desktop Functions in a Client/Server Architecture FIG. 1B is a flow diagram illustrating an example of an authentication process according to embodiments of the present invention, in which a user supplies, for example, login information in order to gain access to content stored on a server. The process of authentication of a user in, for example, a network architecture such as network architecture 100, begins with the client, such as client 110, sending a login request with a username from the client to an authentication server, such as authentication server 160 (step 180). Having received the user's username, the authentication server responds with a challenge (step 182). The client, having received this challenge, prompts the user for the response to the challenge. The user enters their response, and the client responds to the authentication server with this response (step 184). A determination is then made by the authentication server as to whether the user can be authenticated (step 186). If the user cannot be authenticated, access is denied to the user and the process of authentication ceases. It should be noted that, typically, a user may be allowed to repeat this authentication procedure some number of times, in order to allow a user to re-enter their login information (in this case, username and response), such as in the case where the user mis-types their login information or makes some other mistake.

If the user is authenticated, the authentication server responds by sending encoded credentials that allow the user to be identified (step 188). In a network architecture such as network architecture 100, authentication server 160 is capable of communicating with content server 120 and data server 140 via network 125, so that authentication server 160 can provide a user's authentication information and/or identity to content server 120 and data server 140. This allows a context to be established, in which content server 120 and data server 140 can provide information to client 110 that is appropriate for the given user. The use of authentication information, such as username and response employed in the present example, allows content server 120 and data server 140 to identify the user, and so react appropriately to requests from the user, which may include controlling access to web content, the data used to populate certain web pages, and the like.

Once the credentials have been received by the client, the client can make requests for content from the server. If there are no requests from the client, the server simply awaits such requests (step 190). When a request is to be made by the client, a determination is made as to whether the client's credentials are still valid (step 192). If the client's credentials are not valid, the login procedure is once again initiated (step 182). However, if the client's credentials are valid, the client sends its credentials to the server (step 194), which authenticates the request based on the credentials sent by the client (step 196). If the request is authenticated, the server responds with the requested content (step 198).

As to the maintenance of local data cache 155, the data cached in local data cache 155 is maintained by providing client 110 validation information such that client 110 can maintain synchronization of local data cache 155 with, for example, information stored in server data store 150. An example of methods and systems for maintaining information locally are described in greater detail in patent application Ser. No 10/651,923, entitled "METHOD AND SYSTEM FOR MAINTAINING SYNCHRONIZATION BETWEEN A CLIENT'S LOCAL DATA CACHE AND A SERVER'S DATA STORE", filed Aug. 29, 2003, and having V. Sollicito and E. Seitz as inventors, which is included by reference herein, in its entirety and for all purposes.

As noted, FIG. 1B depicts a flow diagram illustrating a process according to an embodiment of the present invention. It is appreciated that operations discussed herein may consist of directly entered commands by a computer system user or by steps executed by application specific hardware modules, but the preferred embodiment includes steps executed by software modules. The functionality of steps referred to herein may correspond to the functionality of modules or portions of modules.

The operations referred to herein may be modules or portions of modules, such as software, firmware or hardware modules. For example, although the described embodiment includes software modules and/or includes manually entered user commands, the various example modules may be application specific hardware modules. The software modules discussed herein may include script, batch or other executable files, or combinations and/or portions of such files. The software modules may include a computer program or subroutines thereof encoded on computer-readable media.

Additionally, those skilled in the art will recognize that the boundaries between modules are merely illustrative and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, those skilled in the art will recognize that the operations described in example embodiment are for illustration only. Operations may be combined or the functionality of the operations may be distributed in additional operations in accordance with the invention.

Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Each of the blocks of the flow diagram may be executed by, for example, a software module) or a portion of a module or a computer system user. Thus, the above described method, the operations thereof and modules therefor may be executed on a computer system configured to execute the operations of the method and/or may be executed from computer-readable media. The method may be embodied in a machine-readable and/or computer-readable medium for configuring a computer system to execute the method. Thus, the software modules may be stored within and/or transmitted to a computer system memory to configure the computer system to perform the functions of the module.

Such a computer system normally processes information according to a program (a list of internally stored instructions such as a particular application program and/or an operating system) and produces resultant output information via I/O devices. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Such a computer system typically includes multiple computer processes executing "concurrently." Often, a computer system includes a single processing unit which is capable of supporting many active processes alternately. Although multiple processes may appear to be executing concurrently, at any given point in time only one process is actually executed by the single processing unit. By rapidly changing the process executing, a computer system gives the appearance of concurrent process execution. The ability of a computer system to multiplex the computer system's resources among multiple processes in various stages of execution is called multitasking. Systems with multiple processing units, which by definition can support true concurrent processing, are called multiprocessing systems. Active processes are often referred to as executing concurrently when such processes are executed in a multitasking and/or a multiprocessing environment.

The software modules described herein may be received by such a computer system, for example, from computer readable media. The computer readable media may be permanently, removably or remotely coupled to the computer system. The computer readable media may non-exclusively include, for example, any number of the following: magnetic storage media including disk and tape storage media; optical storage media such as compact disk media (such as CD-ROM, CD-R, CD-RW and the like), digital video disk (DVD) storage media and the like; nonvolatile memory storage memory, including semiconductor-based memory units such as FLASH memory, EEPROM, EPROM, ROM, application specific integrated circuits and the like; volatile storage media including registers, buffers or caches, main memory, RAM and the like; and data transmission media, including computer network, point-to-point telecommunication, carrier wave transmission media and the like. In a UNIX-based embodiment, the software modules may be embodied in a file which may be a device, a terminal, a local or remote file, a socket, a network connection, a signal, or other expedient of communication or state change. Other new and various types of computer-readable media may be used to store and/or transmit the software modules discussed herein.

Figure 2A:
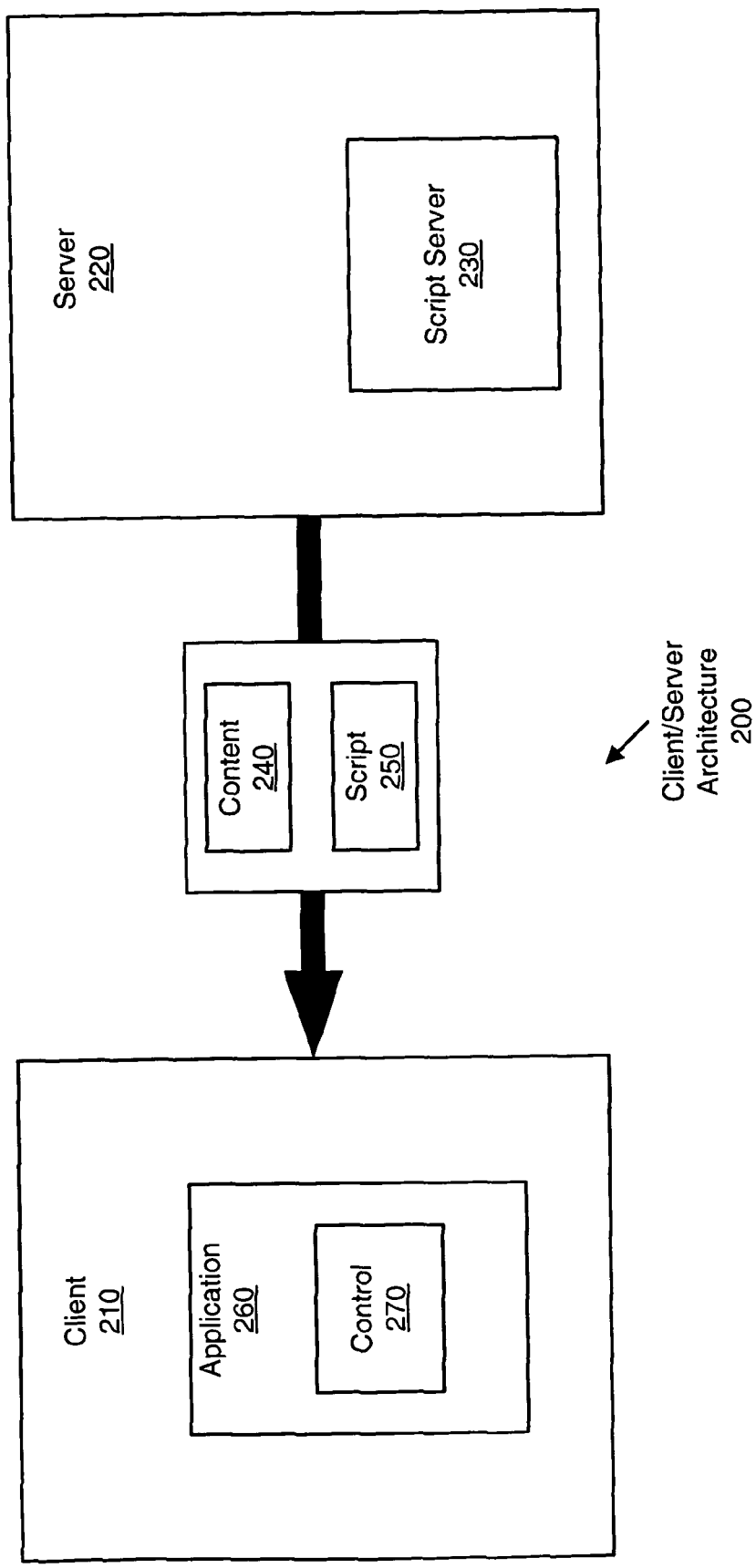
FIG. 2A is a block diagram illustrating an example layout of a client/server architecture according to embodiments of the present invention.

Example Software Architecture According to Embodiments of the Present Invention, and Operation of Same FIG. 2A is a block diagram illustrating, generally, a client/server architecture 200 that supports a control/script arrangement according to embodiments of the present invention. Client/server architecture 200 includes a client 210 and a server 220, in the manner of the client and servers discussed in connection with FIG. 1A, and more particularly, with regard to client 110 and content server 120. Resident on server 220 is a script server 230 that serves the script to be sent to client 210. In the process of serving content (depicted in FIG. 2A as content 240), server 220 also serves a script 250. Client 210 receives content 240 and script 250, and provides this information to an application 260 resident on client 110.

A control 270 within application 260 uses script 250 to perform a function such as presenting content 240 (or data or other information (not shown)) to a user of application 260. In doing so, control 270 enables application 260 to present the user with the interface and operating environment with which the user is familiar, regardless of the client used to access this information. If the given client does not possess the requisite functionality or data to present the interface and operating environment in the desired manner, server 220 can address the situation through the provision of script 250 to client 210, enabling application 260 to acquire the necessary functionality and data.

It will be appreciated that the content and data can be made available from their respective servers, rather than a single server. Alternatively, the data can be sent to the content server, which then serves content, script(s) and data. However, this approach is very demanding because the data is served each time the content is served, and so, is typically slow, in relative terms. It will be appreciated that, in one embodiment, the script is only sent when the application is to first display the content. The script can then be cached, and used until updated or expired.

In one embodiment, there are two points at which a new script is sent. The first is the situation in which new functionality, such as a new module, is to be supported. The second is the situation in which a change is made to an existing module, such as a new feature, is to be added to a module. Typically, in such an embodiment, the script stays substantially the same, but the parameters passed change, changing the functionality presented to the user. A top level script manages the information that is to be presented, and then instantiates that content—the module is thus provided with all the necessary script and other information needed for its presentation. Top level scripts are discussed in detail subsequently.

Figure 2B:
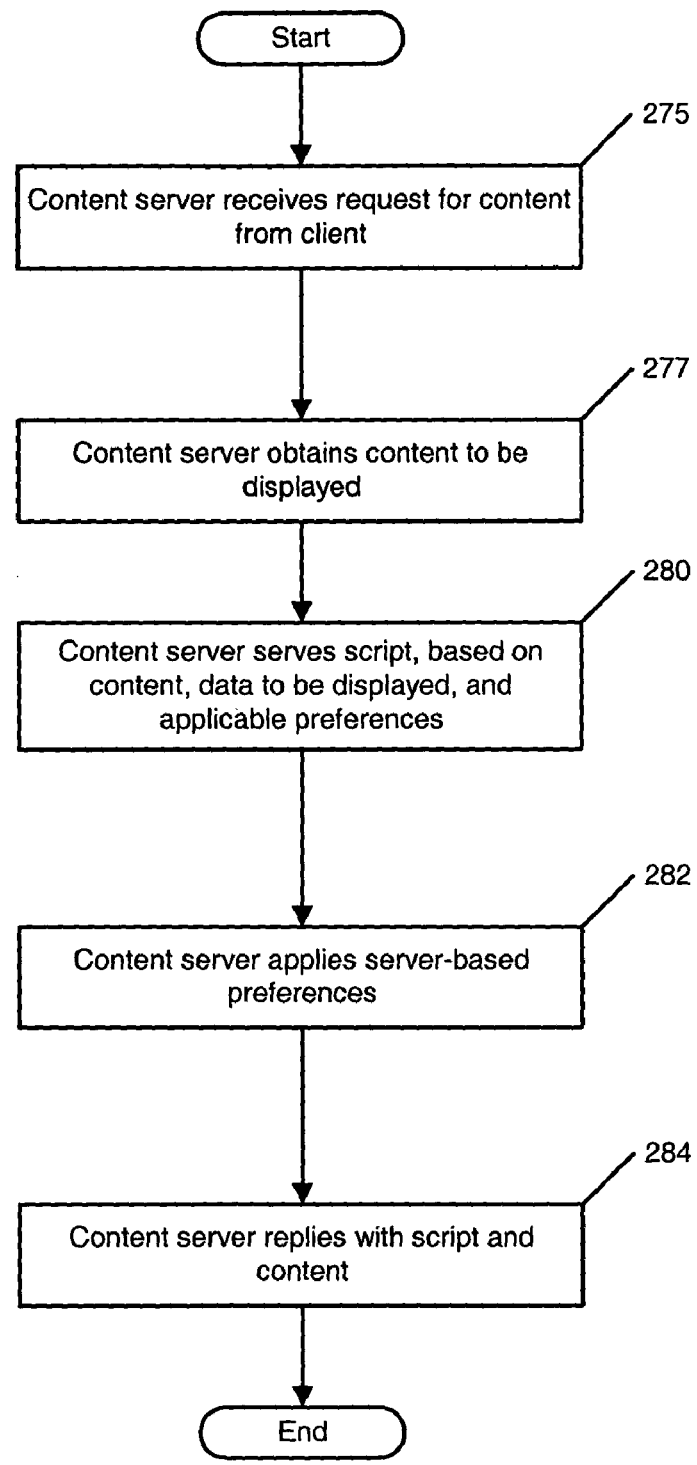
FIG. 2B is a flow diagram illustrating a process of the serving of content according to embodiments of the present invention in the client/server architecture of FIG. 2A.

FIG. 2B is a flow diagram illustrating an example of the operation of a client/server architecture employing a control/script arrangement according to embodiments of the present invention from the perspective of the server. The process begins with the content server receiving a request for content from a client (step 275). Next, the content server obtains the content to be displayed from its content store (step 277). The server then serves a script, which can, for example, be based the content served, data to be presented, and applicable preferences (step 280). Such preferences can be, for example, one or more server-based preferences that are applicable to the generation of the script. Having generated the requisite script, if indeed necessary, the content server applies server-based preferences, and so, inserts data into the content to be provided to the client, for example (step 282). At this point, the content server replies with script and content thus generated/retrieved (step 284).

Figure 2C:
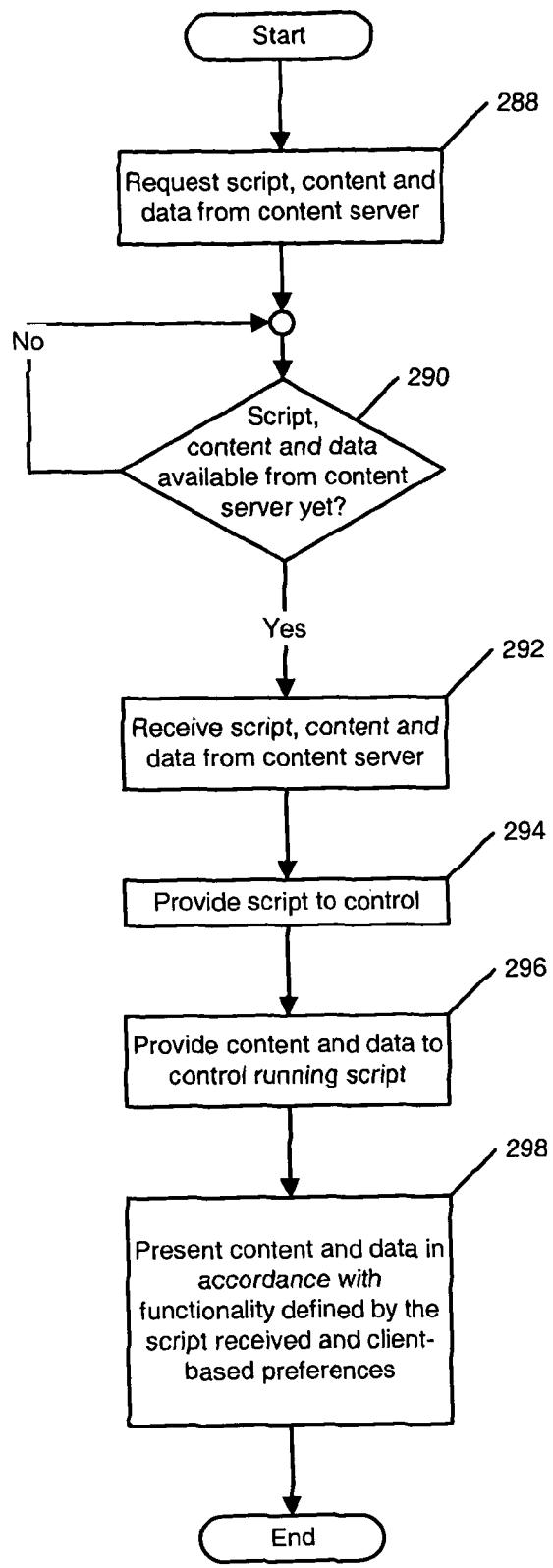
FIG. 2C is a flow diagram illustrating a process of the requesting of content according to embodiments of the present invention in the client/server architecture of FIG. 2A.

FIG. 2C is a flow diagram illustrating an example of the operation of a client/server architecture employing a control/script arrangement according to embodiments of the present invention from the perspective of the client. The process begins with the client requesting one or more scripts, content and/or data from content server (step 288). Next, the client awaits receipt of the script(s), content and/or data from content server (step 290). Once made available by the server, the client receives the script(s), content and/or data from content server (step 292). Once this information is received, the client provides the script(s) thus received to a control running on the client (step 294). Also provided to the control (now running the script(s)) is the content and data provided by the server (step 296). The client is now able to present the content and data in accordance with functionality defined by the script received and server-/client-based preferences (step 298). The information is thus presented to the user in the manner desired by the user, as determined by the user's preferences, and thus reflected in the server- and client-based preferences.

FIG. 3 is an example of a software architecture 300 of a software system for components implementing a user interface according to the present invention. FIG. 3 provides a more detailed view of an example of client/server architecture 200, from a software perspective. Software architecture 300 includes a client application 305, which represents a client application program running (instantiated) on a client computer system (not shown) of a client/server system. Client application 305 produces a user interface 310, which, in this example, includes an application window 320 and a specialized application window 325, using instructions provided by a server 330. Server 330 represents server software running (instantiated) on a server computer system (not shown) for the client/server system, and supports the production of both standard and specialized windows within user interface 310.

One of skill in the art will recognize that the particular form of user interface 310 is but one example of the types of user interfaces that can be provided using the methods and systems described herein. It is not necessary, for example, that a separate application window 320 be provided, such as specialized application window 325. It is within the scope of the invention that portions of the specialized application window 325 instead can be displayed within one or more larger windows arranged in a different format. One of skill in the art will also recognize that the controls depicted in FIG. 3 and other figures can be, for example, browser controls. However, it is to be understood that such controls can be genericized to cover any kind of software modules, thereby allowing the use of techniques according to the present invention in any client/server environment Client application 305 includes two controls, a specialized control 340 and a standard control 350. In the example given, specialized control 340 presents specialized application window 325 (details not shown) of user interface 310, and standard control 350 presents a web page (details not shown) within application window 320. Because in this example, specialized control 340 presents specialized application window 325, specialized control 340 is also referred to herein as a host or control.

Each of standard control 350 and specialized control 340 can communicate directly with server 330. Communication with specialized control 340 can be accomplished, for example, through specialized control interface 360. It is not required that a single server 330 communicate with both standard control 350 and specialized control 340. Standard control 350 may communicate with a standard web server (not shown), whereas specialized control 340 is configured to communicate with a server, such as server 330, that provides both web server functionality and application-specific functionality. For example, server 330 can provide application-specific instructions to specialized control 340, in order to display specialized application window 325.

In the embodiment shown in FIG. 3, each of standard browser 350 and specialized control 340 can be considered to operate independently of the other. Each of controls 340 and 350 independently communicates with server 330, and neither of controls 340 and 350 is nested within the other. As a result, data presented by one of controls 340 and 350 is not necessarily available to the other. An example of the communication of information between controls 340 and 350, and further information regarding such communications, is provided in patent application Ser. No 10/651,476, entitled "SPACE-OPTIMIZING CONTENT DISPLAY," filed Aug. 29, 2003, and having D. Whittle and E. Seitz as inventors, which is hereby included by reference herein, in its entirety and for all purposes.

Client application 305 can be a specialized browser, such as Yahoo! Browser provided by YAHOO! Inc. of Sunnyvale, Calif. Alternatively, client application 305 can be another application using web technology to present information that has also been adapted to use the technology described herein. An example of an adaptation for an application to use the framework described herein is that the application should include an control or other program configured to receive instructions for displaying information provided by a server. This can be accomplished, for example, via a script program in an HTML document or another mechanism for providing the instructions in a format that can be implemented by a browser.

Figure 4:
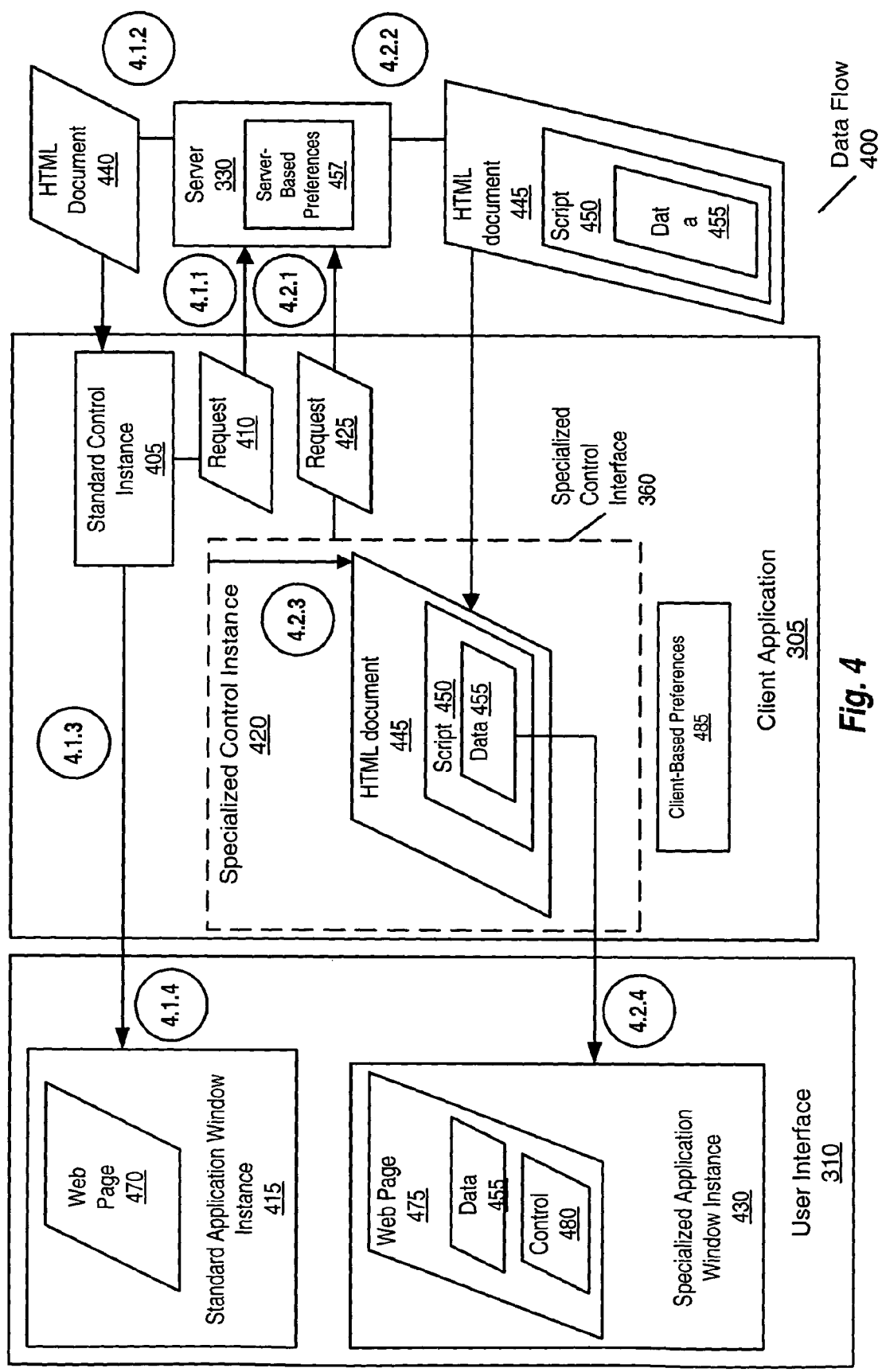
FIG. 4 is a block diagram illustrating an example of a software architecture according to embodiments of the present invention in still greater detail.

Example Process for Providing Desktop Functionally in a Client/Server Environment, and a Software Architecture Therefor FIG. 4 is an example of a data flow 400 through the software system of FIG. 3. Encircled action numbers are included in FIG. 4 to guide the user through the data flow. The order in which certain actions are performed is not mandatory; for example, actions 4.1.1 and 4.2.1 can be considered to occur simultaneously or in either order. In action 4.1.1, an instance of standard control 350, a standard control instance 405, sends a request 410 for a web page to server 330. For example, when client application 305 is started, a user's pre-specified home page can be loaded into standard application window instance 415. When client application 305 is started, a top-level web page can be requested to configure and display a standard application window instance 415. In action 4.1.2, server 330 provides content, such as an HTML document 440, to standard control instance 405 in response to request 410. It will be noted that an HTML document is used as an example herein, it being understood that such information can be, in fact, any appropriate server-based information meant for the control of, presentation by or other use by user interface 310.

In action 4.1.3, standard control instance 405 loads HTML document 440, which results in the presentation of a web page 470 (action 4.1.4). As part of action 4.1.4, web page 470 is presented within standard application window instance 415. However, when configured according to the present invention, client 305 and server 330 support the specialized software (and so, instances thereof) required to present a user interacting with user interface 310 with the interface and environment desired by the user, as defined by the user's preferences stored locally, on the client, and/or remotely, on the server.

In action 4.2.1, a specialized control instance 420 sends a request 425 to server 330. In action 4.2.2, server 330 provides content, such as an HTML document 445, in response to request 425 to specialized control instance 420. HTML document 445 includes a script 450, which, in turn, includes data 455. Script 450 is a program encoded in a scripting language, such as JavaScript, which executes when HTML document 445 containing the script 450 is loaded on client 305. Data 455 can include, for example, data provided by the web server, such as the user's preferences. Such user preferences can be, for example, server-based preferences 457, which can also include information that allows the configuration of the information presented by user interface 310 via the contents of script 450, and so HTML document 445. The use of data such in communicating server-based user preferences, such as server-based preferences 457, is discussed in greater detail subsequently.

In action 4.2.3, HTML document 445, and so, script 450 and data 455, are provided to specialized control instance 420 via specialized control interface 360. In action 4.2.4, when specialized control instance 420 loads HTML document 445, script 450 executes in order to present a web page 475. As part of action 4.2.4, web page 475, which includes a control 480, as well as potentially including some or all of data 455, is presented within specialized application window instance 430. As noted earlier, data 455 can also include information, originally described in connection with server-based preferences 457, that can be used to configure the presentation of, and information presented within, web page 475. Moreover, specialized control instance 420 can be caused to present a visible control, such as control 480, which will be described in greater detail subsequently. In the manner of data 455, in the circumstance where data 455 includes preferences information, client-based preferences can also be employed to control the presentation of functionality and information in a system according to the present invention. In such a case, portions of data 455 might be stored locally, for example, in a local data cache, such as that described previously.

Example Display and Software Architectures

Figure 5:
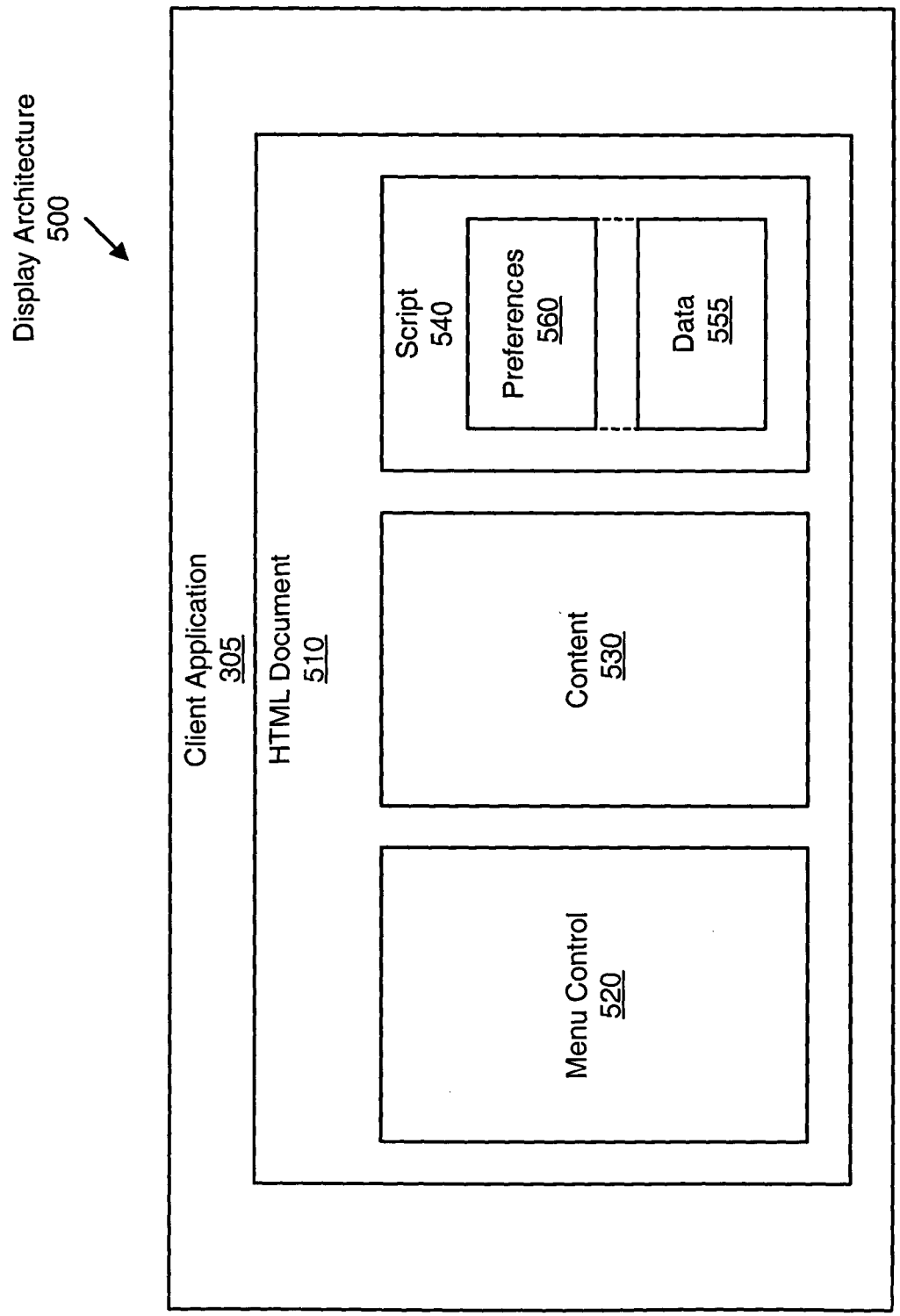
FIG. 5 is a block diagram illustrating an example of a display architecture according to embodiments of the present invention.

FIG. 5 shows an example of a display architecture 500 for components to present an application window such as specialized application window 325 of FIG. 3, or, as instantiated, specialized application window instance 430 of FIG. 4. Display architecture 500 is a simplified version of what might be typically expected to be displayed by a system such as software architecture 300. Display architecture 500 includes an HTML document 510, which can be analogized to HTML documents 440 and 445. As is possible with HTML document 440, HTML document 510 provides a menu control 520, as well as content 530. In addition, however, HTML document 510 also provides a script 550, which can be analogized to script 450 of FIG. 4. As with script 450, script 550 includes data (depicted in FIG. 5 as data 555). Data 555 can be analogized to data 455, but is depicted as including, at least in part, a set of user preferences (depicted in FIG. 5 as preferences 560). Data 555 and preferences 560 are depicted in this manner in order to represent the fact that a portion of data 555 may be displayable (e.g., as part of a menu), or may be used to control the interface and environment, as desired by the user. In these capacities, data 555 represents user preference data sent from a server such as server 330. Such user preference data can be, for example, information residing on server 330 as server-based preferences 457. Alternatively, preferences 560 may also include user preferences stored locally on the client, such as client-based preferences 485. Ultimately, these preferences determine what information is presented, and how that information is presented.

Figure 6:
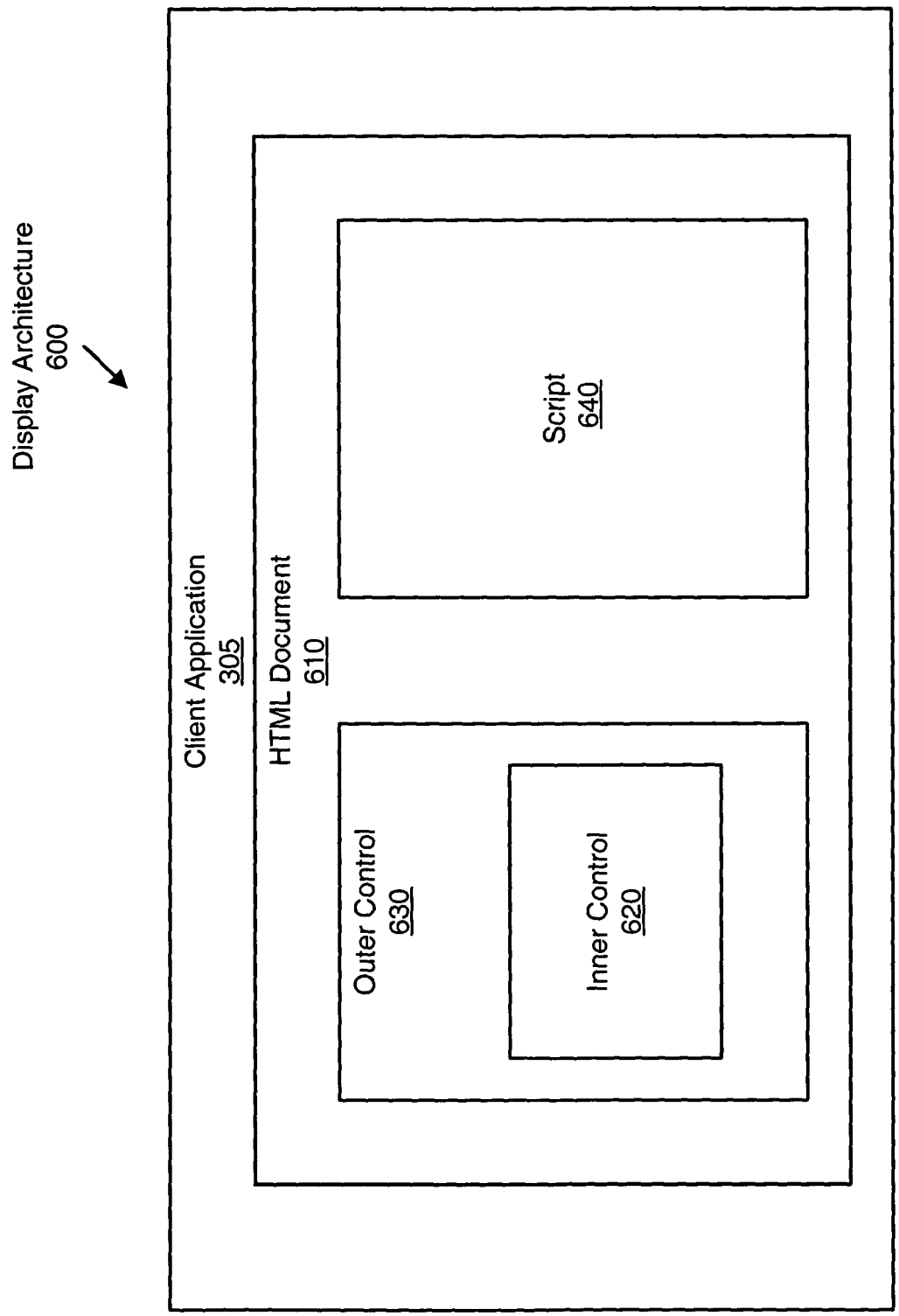
FIG. 6 is a block diagram illustrating an example of a display architecture according to embodiments of the present invention in greater detail.

FIG. 6 is a block diagram of another example of a display architecture for components to present an application window such as specialized application window 325, in the manner of display architecture 500. In the manner of FIG. 5, a display architecture 600 includes an HTML document 610, which can also be analogized to HTML documents 440 and 445, and so result in the presentation of similar information. However, in the case of HTML document 610, nesting of controls is depicted. In display architecture 600, HTML document 610 supports an inner control 620 nested within an outer control 630. The presentation of inner control 620 and outer control 630 are under the control of a script 640.

Figure 7:
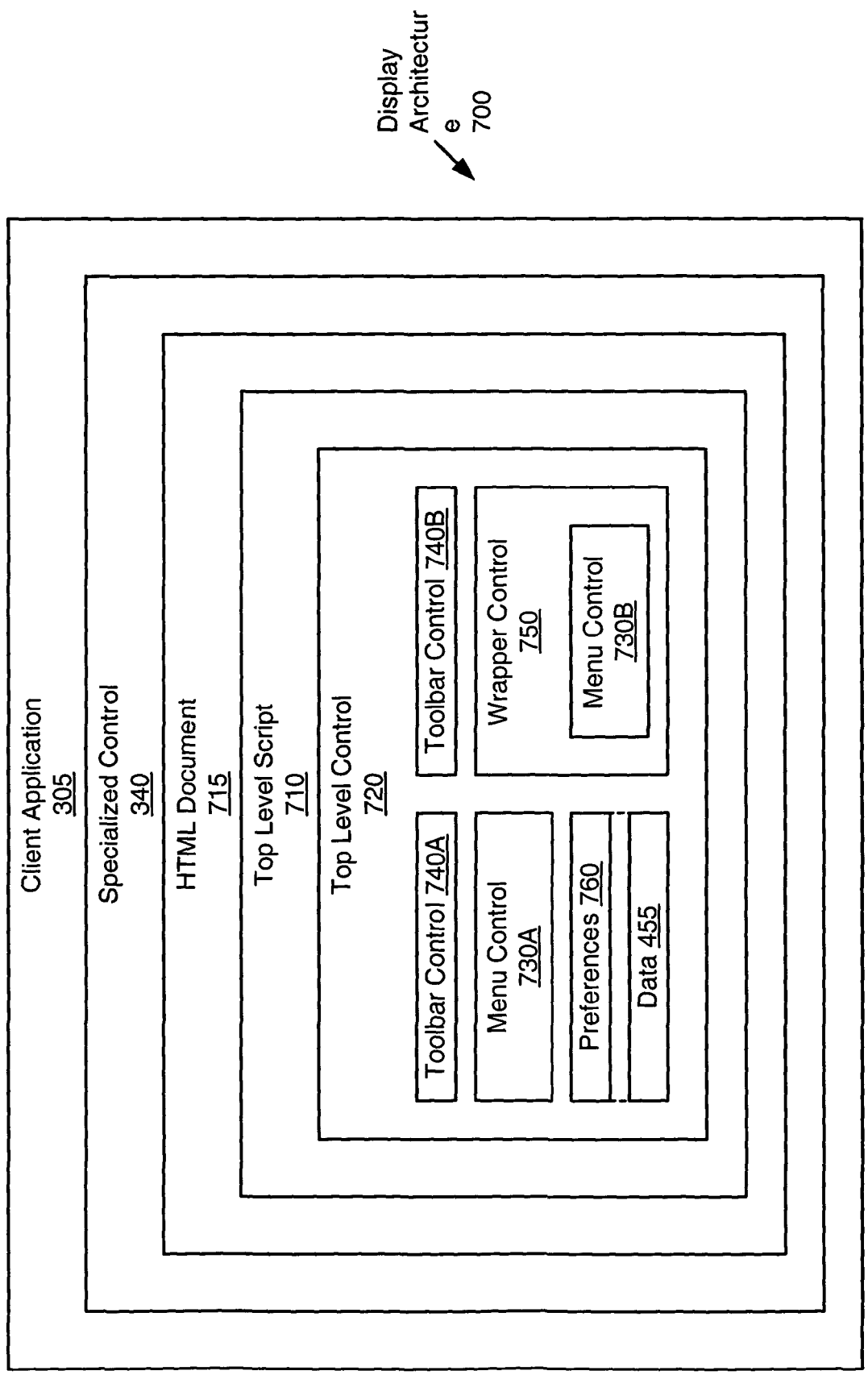
FIG. 7 is a block diagram illustrating an example of a display architecture according to embodiments of the present invention in still greater detail.

FIG. 7 shows an example of a detailed software architecture for components to present an application window such as specialized application window 325 of FIG. 3. In the manner such as that described previously, a software architecture 700 includes a client application 305, which provides a user interface such as user interface 310 of FIG. 3A. Client application 305 operates in conjunction with a server such as server 330 of FIG. 3 (not shown), which provides both information for presentation to a user and instructions to client application 305 for displaying the information. For example, in the example shown in FIG. 7, these instructions are provided to specialized control 340 running within client application 305 in the form of a script program. As noted, this script can be configured, as least in part, based on preferences residing on the server, and can, in fact, include such preferences regarding the presentation of the information, for example, in the manner of data 455.

Specialized control 340 does not provide a visible portion of the user interface, but instead serves as a host for other components that display specialized application window 325 of FIG. 4. A top level script 710 is provided as part of an HTML document 715, which is an example of HTML document 445. Top level script 710 is a script program, and also does not provide a visible portion of the user interface, but instead configures the display provided by a top level control 720. Top level script 710 is provided by a server (such as server 330 of FIGS. 3A and 3B) operating in conjunction with client application 305. Top level script 710 is provided as part of an HTML document, such as script 450 within HTML document 445 of FIG. 4. The instructions included in top level script 710 instruct top level control 720 to present a web page such as web page 475, for example. As noted, a script such as top level script 710 can be configured using client- or server-based preferences, in order to cause information and functionality to be presented to the user in the desired manner.

The web page produced by top level control 720 provides modules and toolbars. Four controls are illustrated within top level control 720, including menu controls 730A and 730B for presenting a menu for a given module. Top level control 720 can also contain toolbar controls, such as toolbar controls 740A and 740B, for presenting a toolbar associated with a given module. Top level control 720 provides inter-module communication, configures the layout for displaying modules, responds to menu choices within modules, and manages sizing between panes for different modules. Functionality for performing these functions are provided by the server in top level script 710. In one embodiment, to support coordination between modules, each control included within top level control 720 implements a standard interface for communicating with other modules via top level control 720.

Two types of module controls are shown within top level control 720, a client-based module control 730A and a web-based module control 730B. In the example, module menu control 730A can be hosted directly by a client computer system running client application 305. Although data to display by module menu control 730A can be obtained from the server, menus presented are laid out directly by module menu control 730A without instructions from a server regarding content for populating menus or responses to menu choices.

Module menu control 730B represents a control having a web host; i.e., the module presented receives input in the form of an HTML document, also referred to herein as a web module, provided by the server. Module menu control 730B is "wrapped" in specialized web module client wrapper control, a wrapper control 750. The wrapper provided by wrapper control 750 provides an interface for the web-based module menu control 730B to receive instructions from the server for presenting an interface to the web-based module. The wrapper provided by wrapper control 750 also enables features to be provided for the menus presented by an instance of module menu control 730B, without the need for the code of the HTML module itself to be changed.

As will also be appreciated, portions of data 455 can be those transferred to client application 305 as user preferences from the server, which are referred to herein as server-based preferences, and such appear in FIG. 7 as preferences 760. Alternatively, portions of data 455 can be used for presentation to the user, for example, as menu selections. A detailed discussion of an example of software architecture 700 can be found in the Patent Application entitled "SPACE-OPTIMIZING CONTENT DISPLAY," as previously included by reference herein.

It will be appreciated that preferences are relevant to individual controls, as well as the top-level control, as discussed. Both client-based controls and server-based controls can be made to employ server-based preferences. It will also be appreciated that certain preferences can be applied to the content and data at the server, and certain other preferences applied to the content and data at the client. In operation, the user changes preferences in a dialog that is presented by the client, but the content, layout, and logic of which is controlled by the server, as described elsewhere herein.

Figure 8:
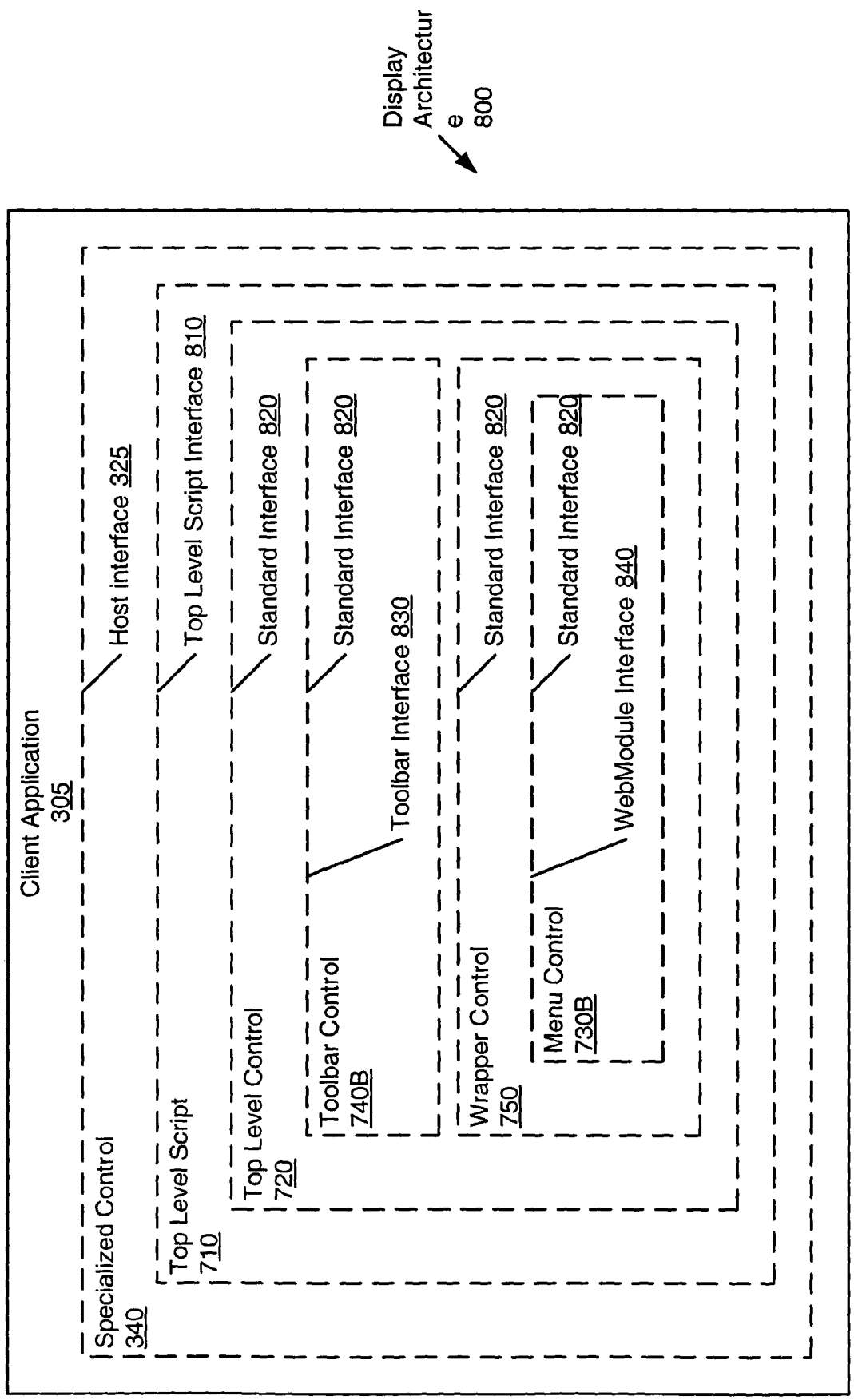
FIG. 8 is a block diagram illustrating an example of an instantiated display architecture according to embodiments of the present invention.

Example Interfaces for a Software Architecture According to the Present Invention FIG. 8 shows examples of interfaces that can be used in the software architectures of FIGS. 3 and 7. Each control in FIG. 7 is shown, along with the name of an interface for communicating with each respective control. Examples of methods and properties for each interface shown are described in the Patent Application entitled "SPACE-OPTIMIZING CONTENT DISPLAY," as previously included by reference herein.

Host interface 325 provides an interface for communicating with instances of specialized control 340. Host interface 325 is implemented by specialized control 340 and can include, for example, an ApplicationName property having the name of the application, such as client application 305, in which the host instance resides. A MainBrowser property can provide an interface for a control, such as standard control 350 of FIG. 3, that presents a web page within the main application window (such as web page 470 presented within standard application window instance 415 of FIG. 4). A HostWindow property can provide a handle (an identifier for an instance) of a window in which the host instance is running. Examples of methods that can be provided by host interface 325 include the following:

Nav—Navigate an application's main browser window, such as client application 305, to a specified URL. This method can be called by one of the components presenting the window to cause a web page to be displayed in response to an event. For example, in response to a click of an Inbox button within a mail module of the window, the contents of the user's Inbox can be displayed in the application window adjacent to the window.

NavNew—Open a new browser window and navigate new browser window to a specified URL. This method can be called by one of the components presenting the window to cause a new window to be opened to display a web page in response to an event. For example, in response to a click on a Compose button within a mail module of the window, a new window can be opened in which the user can type a mail message. In contrast to the Nav method, the NavNew method preserves the current contents of an adjacent application window.

Is Connected—Determine whether a network connection exists. This method can be used, for example, to suspend activities such as automatic updates to data on the network when the client computer system no longer is connected to the network.

As will be appreciated, any number of other methods can be provided by host interface 325.

Referring back to FIG. 8, top level script 710 implements a top level script interface 810. Top level script interface 810 can include a set of functions (in a script) that are executed when the top level page is loaded. An example of such a set of functions, as well as a script such as top level script 710, is given in the Patent Application entitled "SPACE-OPTIMIZING CONTENT DISPLAY," as previously included by reference herein. Examples of methods that can be provided by top level script interface 810 are included therein.

A standard interface 820 is implemented by top level control 720, as well as by other controls nested within top level control 720. These other controls include menu controls such as menu control 730B, toolbars such as toolbar control 740B, and other such controls, such as wrapper control 750. Examples of methods that can be provided by standard interface 820 are included in the Patent Application entitled "SPACE-OPTIMIZING CONTENT DISPLAY," as previously included by reference herein.

Referring again to FIG. 8, toolbar control 740B implements both standard interface 820 and toolbar interface 830. Toolbar interface 830 can be used, for example, by the script provided within the top-level page to populate the main toolbar. In addition, toolbar interface 830 can be used by a module script to populate module toolbars. Populating a toolbar includes specifying which icons to provide within the toolbar and the functionality to be provided by each toolbar icon. Methods can be provided within toolbar interface 830 to specify a toolbar's buttons, background appearance, graphics, sizing behavior, tooltips, and so on. Because both the script and the module scripts are provided by the server, the display and functionality of each toolbar can be re-configured at the server without the need to update the client application.

Menu control 730B implements both standard interface 820 and a web module interface 840. Web module interface 840 is used by a web-based module, such as the web-based module provided by menu control 730B of FIG. 7, to enable the web-based module to receive instructions from the server for presenting the module within top level control 720, and so the window of client application 305. A web-based module receives only HTML for a web page and scripts embedded therein, and thus does not implement an interface directly. In one embodiment, web module interface 840 is implemented as a set of functions within a module script, that is provided within a module-specific web page for the module. These functions are invoked by web interface control 750 to perform as a proxy for standard functions, such as the functions performed by methods StartUp, Shutdown, sbSetParams, and sbNotify in standard interface 820.

Example Implementations Desktop Functionality in a Client/Server Environment

Auto-Complete Feature

As noted, embodiments of the present invention are able to provide desktop application functionality and speed by basing data and functionality on a server, and providing that data and functionality to a client, as necessary. One example of such an arrangement is the ability to provide an AutoComplete function in a server-based e-mail program. In such a scenario, the basic functionality is provided by a server. Such a server sends a "Mail" web page, as well as the script, and potentially, data, necessary to provide the AutoComplete function. Once made available from the server, data used by the AutoComplete function can be maintained in a local data cache in the manner described earlier. Such data may be used both in controlling, as well as for presentation by, the Auto-Complete function. In the case where the data includes a number of selections, the AutoComplete function allows the presentation of the potential alternative entries in one or more fields in the "Mail" web page, based on the first few letters entered by the user.

The Address AutoComplete ActiveX Control (the AutoComplete control) maintains a list of e-mail suggestions based on the user's Address Book data, which resides on the data server. The list of suggestions is used for a feature referred to herein as Address AutoComplete (AutoComplete). When a user of the AutoComplete types in the "To:", "Cc:", or "Bcc:" fields of a Mail Compose page, for example, the user sees a dropdown list of suggestions that start with (case-insensitive) whatever the user has typed for the current e-mail address. The AutoComplete control provides the data for this feature through the GetFirstSuggestion and GetNextSuggestion methods. The AutoComplete control has no user interface. The display of the dropdown list and the processing of all user input that allows the user to find and select the desired entry, is performed by a script, such as a JavaScript, as noted elsewhere herein. Using the properties and events of the AutoComplete control, the script is able to determine when the AutoComplete control is present, if the current user is using AutoComplete on this machine, and if the AutoComplete control is ready to provide e-mail suggestions.

The AutoComplete control manages a local data cache of e-mail address suggestions generated from data stored in a user's data (e.g., an Address Book) stored in a server's data store. The AutoComplete control maintains a local data cache for each user. Each user's local data cache (a local cache file) is encrypted with a unique key that is not stored on the client. Each user's key is only available to that user when that user is logged into the data server. The AutoComplete control ensures that the local data cache contains current data before that data is used. Examples of these operations and their execution are given in the Patent Application entitled "METHOD AND SYSTEM FOR MAINTAINING SYNCHRONIZATION BETWEEN A CLIENT'S LOCAL DATA CACHE AND A SERVER'S DATA STORE," as previously included by reference herein. It will be appreciated that the AutoComplete control has no user interface, and so everything a user sees and interacts with is provided through HTML or (primarily) JavaScript.

In the present example, the AutoComplete control embodies substantial knowledge as to how to turn the data received by the AutoComplete control into a list of e-mail suggestions. The script embodies the knowledge regarding how to present suggestions to a user, based on their input, as well as providing several ways for a user to make a selection. The order in which the suggestions appear is driven by the ActiveX control. A OneE-mailPerContact parameter informs the AutoComplete control whether the AutoComplete control should use only one or multiple (e.g., up to three) possible e-mail addresses per contact when generating the list of suggestions. The server's role in passing this parameter to the ActiveX control is to pass along the value of a user preference stored on the server, in the manner of server-based preferences, as described elsewhere herein.

In the typical scenario, the AutoComplete control is instantiated each time a new e-mail is composed. Each time the AutoComplete control is instantiated, the AutoComplete control makes a request to the data server to determine if the data server's data store of the data server is newer than the client's local data cache. In the present example, such a data server is an Address Book server. If the server's data store is newer than the local data cache, then a new copy of the data is returned with the response. The AutoComplete control uses this data to generate a list of e-mail suggestions, and then encrypts the data and writes the data to the local data cache. The data is encrypted using the encryption key included in the response. If the data stored in the local data cache matches the data stored in the server data store, then the list of suggestions in the local data cache is read, decrypted (using the encryption key included in the response), and used by the AutoComplete control. An example of such a process is given in the Patent Application entitled "METHOD AND SYSTEM FOR MAINTAINING SYNCHRONIZATION BETWEEN A CLIENT'S LOCAL DATA CACHE AND A SERVER'S DATA STORE," as previously included by reference herein.

An implementation of an AutoComplete function for an e-mail application includes, for example, the following methods:

GetFirstSuggestion([in] STRING startsWith, [out,retval] STRING *suggestion)—Returns the first e-mail list entry that starts with (case-insensitive) the value of 'startsWith'. This method first checks to ensure that the content in use has completed loading. Next, the method checks to ensure that AutoComplete is enabled and that the address information is available in the local data cache. This method takes the input string (the letters typed in (so far) by the user) and uses that to search the local data cache for the first match. Once the first match is found (if any), the method returns the address matching the information entered by the user.

GetNextSuggestion([in] STRING startsWith, [out,retval] STRING *suggestion)—Returns the next e-mail list entry that starts with (case-insensitive) the value of 'startsWith'. This method also takes the input string (the letters typed in (so far) by the user) and uses that to search the local data cache for the next matching address. In a manner similar to GetFirstSuggestion, this method performs all the requisite checks, and then searches the local data cache. Once the next match is found (if any), the method returns the address matching the information entered by the user. This can be iteratively repeated, until no further matches occur, or some other terminal condition is reached, such as a maximum number of selections having been presented to the user.

ReloadCache([in] BOOLEAN force)—Repeat the request to the address book server, as described above. If force is TRUE then the request will not include the "t" param, so the address book data will be unconditionally fetched. The "t" parameter indicates the timestamp of the given local data cache, or a substitute value intended to cause the data server to take a given action (e.g., a value of zero, in order to force the data server to refresh the local data cache). This method first checks to ensure that the content in use has completed loading. Next, the method checks to ensure that AutoComplete is enabled. This method then forces the existing local data cache to be replaced with new data from the server, by forcing the server to send the new data.

DeleteCache(BOOLEAN disableAutoComplete)—Delete the current user's cache file. Setting 'disableAutoComplete' to TRUE disables the AutoComplete feature on the client by setting the same registry flag set when the UseAutoComplete property is set to FALSE. This method gets the directory path of the file that contains the local data cache, and deletes the file.

GetInAddressBookFlags([in] STRING e-mailListIn, [out, retval] STRING *flags)—'e-mailListIn' is a comma-delimited list of e-mail addresses or nicknames in which each entry in the list could be: a nickname, an e-mail address, an "Insert Addresses" generated value, or an AutoComplete generated value. The 'flags' argument is a comma-delimited list of numbers. The number of entries in flags should match the number of entries in 'e-mailListIn'. The number returned for each entry is "1" if the e-mail entry is already in the address book and "0" otherwise. It will be appreciated that this function is not expected to recognize non-AutoComplete nicknames as being in the address book. An AutoComplete-generated nickname entry can, for example, include the e-mail address for that nickname inside of < > (e.g., 'Jake <jsmith@yahoo.com>') An example of a non-AutoComplete nickname would be 'Jake' by itself.

PreprocessE-mailList([in] STRING e-mailListIn, [out, retval] STRING *e-mailListOut)—'e-mailListIn' is a comma-delimited list of e-mail addresses or nicknames in which each entry in the list could be: a nickname, an e-mail address, an "Insert Addresses" generated value (e.g., '"Jake Smith" <jsmith@yahoo.com>'), or an AutoComplete generated value (e.g., '"Jake Smith" <jsmith@yahoo.com>'). The argument 'e-mailListOut' is a comma-delimited list of e-mail addresses containing one entry for each entry in 'e-mailListIn'. If the corresponding 'e-mailListIn' entry contains an e-mail address inside of < >, then that value is extracted and returned. Otherwise, if the corresponding 'e-mailListIn' entry is a nickname from the address book, then the default e-mail for that contact is returned. Otherwise, the entry itself is returned unchanged.

TABLE 1

Example AutoComplete Control Properties

| Name | Type | Access |
| --- | --- | --- |
| Version | String (STRING) | Read-Only |
| IsAutoCompleteControlReady | Boolean (BOOLEAN) | Read-Only |
| IsAddressBookCacheReady | Boolean (BOOLEAN) | Read-Only |
| FeedLastModified | 4-Byte Integer (long) | Read-Only |
| FeedFormatVersion | String (STRING) | Read-Only |
| FeedRequestTime | 4-Byte Integer (long) | Read-Only |
| UseAutoComplete | Boolean (BOOLEAN) | Read/Write |
| ConsentRequired | Boolean (BOOLEAN) | Read-Only |

Figure 9A:
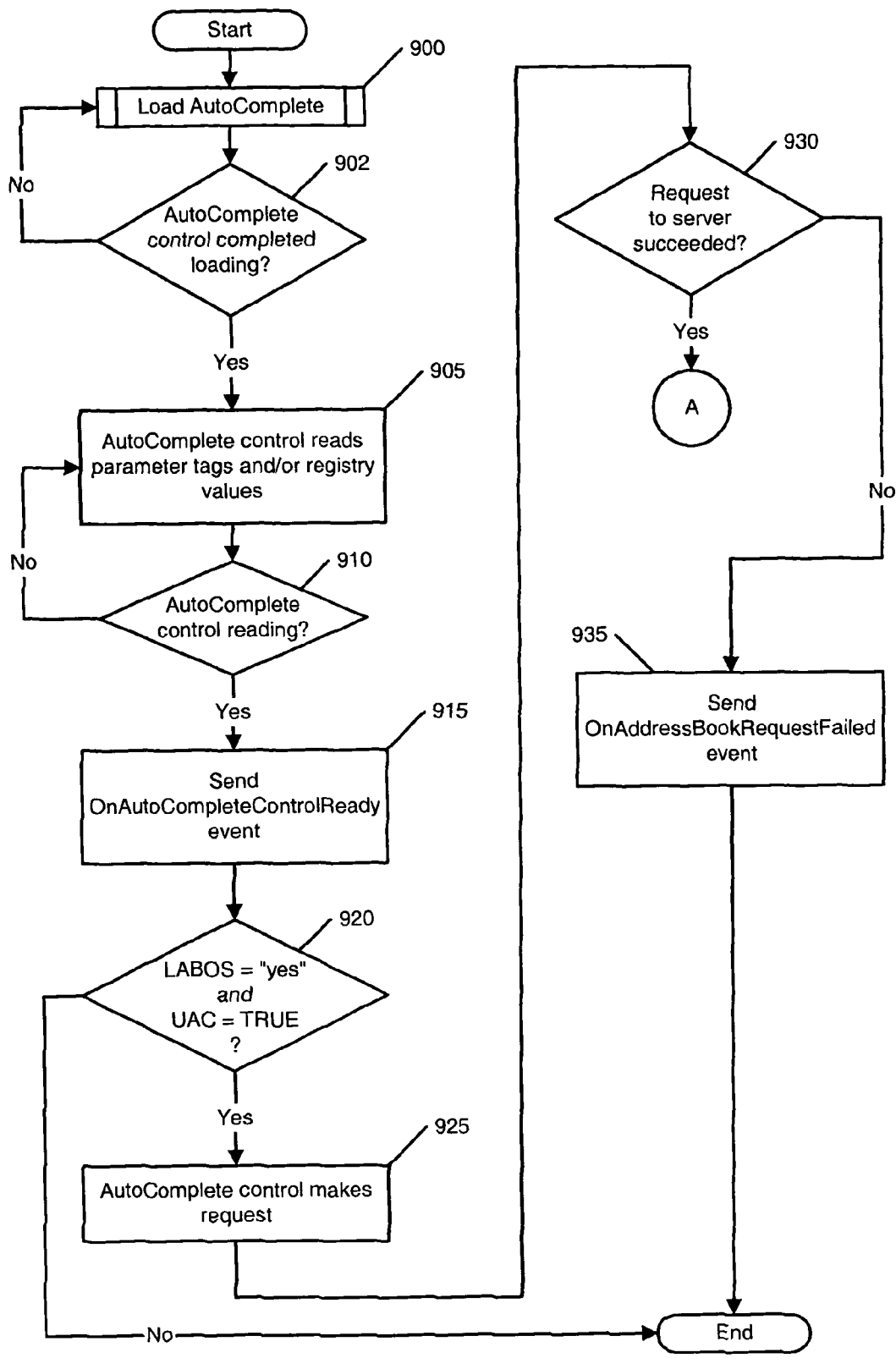
FIGS. 9A and 9B are flow diagrams illustrating an example of the operation of a control according to embodiments of the present invention, such as the AutoComplete control, can be implemented.
Figure 9B:
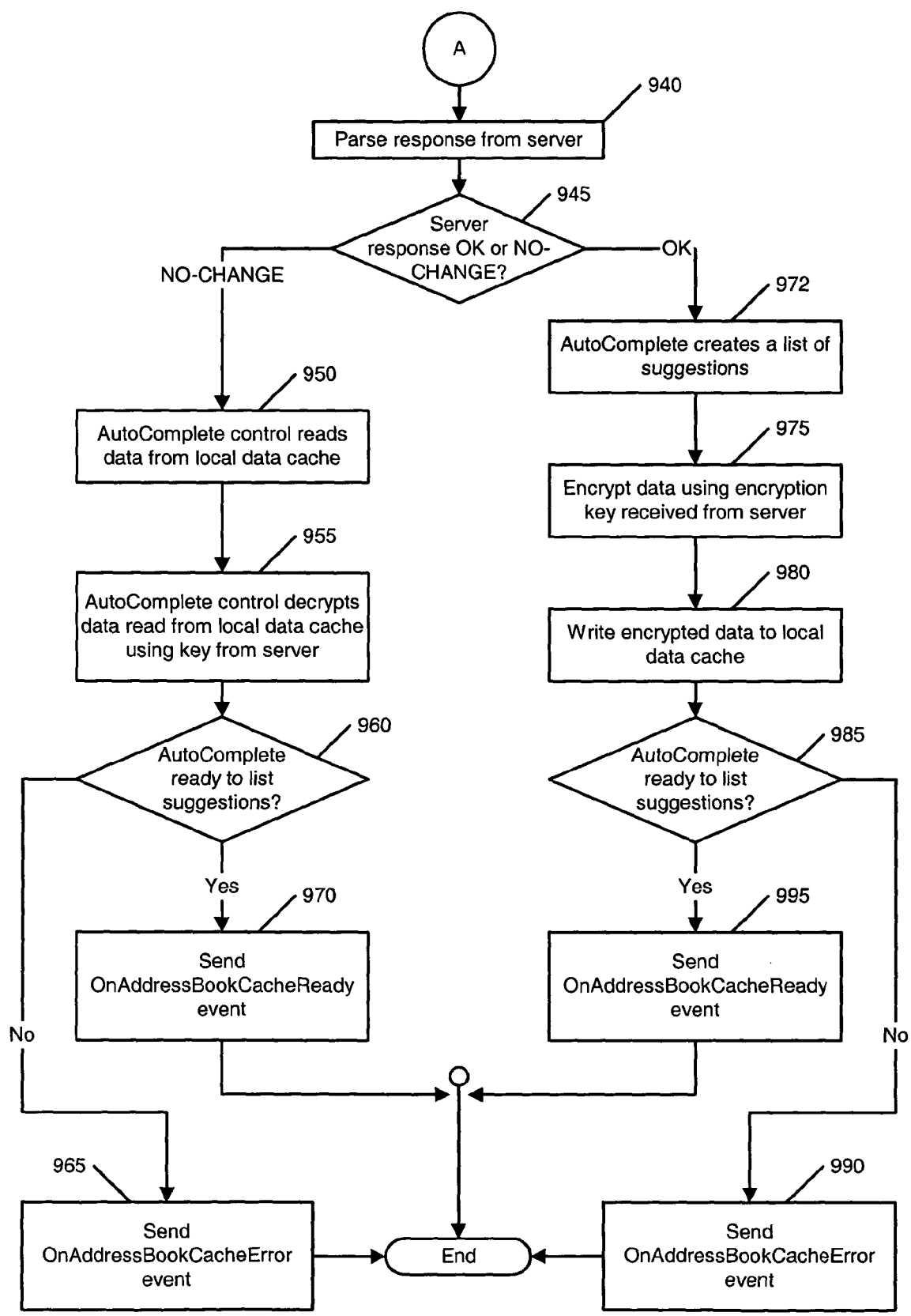

FIGS. 9A and 9B are flow diagrams illustrating an example of the operation of a control according to embodiments of the present invention, such as the AutoComplete control, can be implemented. In operation, a control such as the AutoComplete control initiates events in order to perform various actions associated with its operation. In turn, the events employ the aforementioned methods to access the requisite data and present that information to the user. In one embodiment, there are four events the AutoComplete control can initiate:

1. OnAutoCompleteControlReady
2. OnAddressBookRequestFailed
3. OnAddressBookCacheReady
4. OnAddressBookCacheError The process begins with the downloading of the AutoComplete control (step 900). This downloading is performed in the manner described with regard to FIGS. 2A-8, with regard to a server providing functionality to a client. Once the AutoComplete control has finished loading (step 902), and reading in parameter tags and/or registry values to setup its initial state (steps 905 and 910), the OnAutoCompleteControlReady event is sent (step 915). In one embodiment, the "LoadAddressBookOnStartup" (LABOS) parameter tag and UseAutoComplete (UAC) environment variable are then checked (step 920). If the LABOS parameter tag is absent (or present and set to "yes"), and UAC is TRUE, the AutoComplete control makes its request to the address book server (the data server) (step 925). Otherwise, the process simply ends, as a LABOS parameter tag that is present and set to "no", or UAC that is FALSE, indicate that the AutoComplete feature is not to be used. A determination is then made as to whether the request to the address book server has succeeded (step 930).

If the request to the address book server fails, the AutoComplete control send an OnAddressBookRequestFailed ([in] STRING reason) event (step 935). Typically, one of two reasons causes this request to fail: the user is not logged in on the server, or the user's session has expired. Because, in one embodiment, the request for the content from the content server, a Mail Compose page from a Mail Server, for example, only succeeds if the user is signed-in to the network and their session has not expired, the first of these errors, "ERROR:No Login," should not occur when the AutoComplete control is used on such a Mail Compose page, because the user will typically be logged in prior to navigating to this page. The second error, ERROR:Login Timeout, is unlikely to occur. For this to occur, the user's session would have to expire between the time the request for the Compose page is processed, and when the AutoComplete control, on the Mail Compose page, makes its request to the address book server, which occurs just after the AutoComplete control is loaded.

If a failure occurs reading or writing the local data cache, the AutoComplete control initiates the OnAddressBookCacheError([in] STRING reason) event instead of OnAddressBookCacheReady event. In practice, such errors are infrequent, but it is possible for such errors to occur. In the event the AutoComplete control cannot read or write a local data cache, the AutoComplete control deletes the local data cache, if possible. In one embodiment, this equates to deleting the cache file. Removing the local data cache returns the client and local data cache to their initial state, and a subsequent refresh, or presentation, of the Mail Compose page causes the AutoComplete control to request a full download (OK), and to write the local data cache.

Situations where a read error could occur:
1. The address book server returns the wrong key for the current user, because if the key is wrong, a failure occurs when the AutoComplete control attempts to decrypt the local data cache with that key.
2. The user performs an action that changes their key, but the Mail Server fails to put a changed key-ID in the compose page.
3. The current user's cache file is corrupted for some reason. This could be caused, for example, by another party editing the local data cache. The decryption algorithm detects changes in the size of the local data cache, as well as changes in the local data cache's data, as so become aware of such tampering. In response, the AutoComplete control will request a full download (OK), as noted.
4. The current user does not have read permission to the local data cache file's directory or the local data cache file itself.

Situations where a write error could occur:
1. The current user doesn't have write permission to the local data cache file's directory or the local data cache file itself.
2. Another party set the permissions on the current user's local data cache to Read-Only. The AutoComplete control can be configured to delete the cache file in this situation, resulting in a refresh that replaces the local data cache file.

However, if the request to the address book server succeeds, as indicated in FIG. 9A as a reference "A" to FIG. 9B, the response is parsed (step 940). Once the response has been parsed, one of two things can happen (step 945). If the response is a NO-CHANGE response, and so includes a decryption key, the AutoComplete control reads the data from the user's local data cache (step 950) and decrypts that data using the decryption key received from the sever (step 955).

A determination is then made as to whether the AutoComplete control is ready to use the list of e-mail suggestions (step 960). If the AutoComplete control is not ready to use the list of e-mail suggestions, the AutoComplete sends an OnAddressBookCacheError event to indicate a cache read failure (step 965). The process is thus complete. If the AutoComplete control is ready to use the list of e-mail suggestions, the AutoComplete control sends the OnAddressBookCacheReady event (step 970). The operation of listing suggestions is then complete.

Alternatively, the response can be a full download (OK) response, which includes an encryption key. First, the AutoComplete control creates a list of suggestions (step 972). Next, the AutoComplete control encrypts the list using the user's key (step 975) and writes the data to the user's cache file (step 980). The AutoComplete control then makes a determination as to whether the AutoComplete control is ready to use the list of e-mail suggestions (step 985). If the AutoComplete control is not ready to use the list of e-mail suggestions, the AutoComplete sends an OnAddressBookCacheError event to indicate a cache write failure (step 990). If the AutoComplete control is ready to use the list of e-mail suggestions, the AutoComplete sends the OnAddressBookCacheReady event (step 995). Once these operations have been performed, the operation of listing suggestions is complete, as before.

User Preferences

As previously noted, control over the operation of a client can be achieved using a control/script combination, such as an ActiveX control/JavaScript combination. This allows a server, with access to the data and content to be presented by the client, to drive operations. Thus, the entity having the most knowledge of the information to be presented (that is, the server) controls the manner in which that information is presented.

In operation, such an approach allows for the operation of a server-based information system in the manner of a client-side system without an actual client by providing one or more ActiveX controls that present the client as a local interface on the server. A server-based e-mail program is one of many possible examples. In fact, the client, in this mode, does not use, and may not even possess, the functionality associated with a full local interface into the server-based system. Instead, the ActiveX controls allow the client to act like a terminal attached to the server, where the server maintains sufficient functionality to allow the client's user to perform the necessary operations (this can be a reduced feature set, if necessitated by the network environment).

Such an approach provides an extensible interface on the client that can be fashioned as needed to present the information (content) from the server in the most efficient and effective manner. By implementing an interface according to the present invention, the server can be given control over what functions (of those supported by the server) that the client is allowed to perform. As new functions are added on the server (whether to the server providing content or data, should those functions be supported separately), the client can be easily updated. Thus, for example, if a new function is implemented on a server, the client receives a new JavaScript, which includes the information needed to allow the client to access that new functionality.

Returning to the example of a sever-based e-mail application, a server supporting such functionality might offer features such as subject information, deletion, priority indication, flagging, and to/from/cc:/bcc: information to a given client. In fact, such capabilities can be employed to implement user preferences, in which preferences information, stored on the server, is used to control the presentation of information and functionality to the user. Alternatively, the server might allow presentation and use of subject, deletion and priority indication, and the client might employ only subject and deletion, and not present the use priority indication, based on the user's preferences. Thus, the server in such an architecture controls the functionality and information the client is allowed to provide to the user.

The example of an e-mail module is one of many such modules that can employ preferences in order to provide the user with uniform functionality and environment, as between clients. Using the foregoing discussion of FIGS. 2A-9 and e-mail example, a module's toolbar can includes buttons that allow the user to view their inbox, compose a message, refresh displayed information, configure the Mail page and perform other actions associated with a desktop e-mail application.

In particular, the user can access a configuration window that allows for presentation of configuration information for the module that generates the Mail page. For example, the user can select the number of messages to be previewed, choose folders from which to view messages, indicate whether unread messages only are to be displayed, indicate whether to include shortcut links to all folders, select whether to provide a confirmation prompt whenever the user chooses to delete a message and/or indicate other configuration to the server. These configuration options are stored by the server as user preferences, and so are referred to herein as server-based preferences, as noted previously.

Such server-based preferences are used by the mail module when a Mail page is to be presented to the user. The Mail page and messages presented by the mail module therein are thus presented in accordance with the server-based mail configuration options, as configured by a user employing the configuration window. It will also be appreciated that such server-based preferences can be downloaded to the client and stored in the form of client-based preferences. Such client-based preferences can be stored in the local data cache, and so be maintained by the associated mechanisms. Alternatively, such client-based preferences can be downloaded and refreshed periodically. In either case, by using server-based preferences, a user's preferences can be made available to any client the user may wish to use.

An Example Computing and Network Environment

Figure 10:
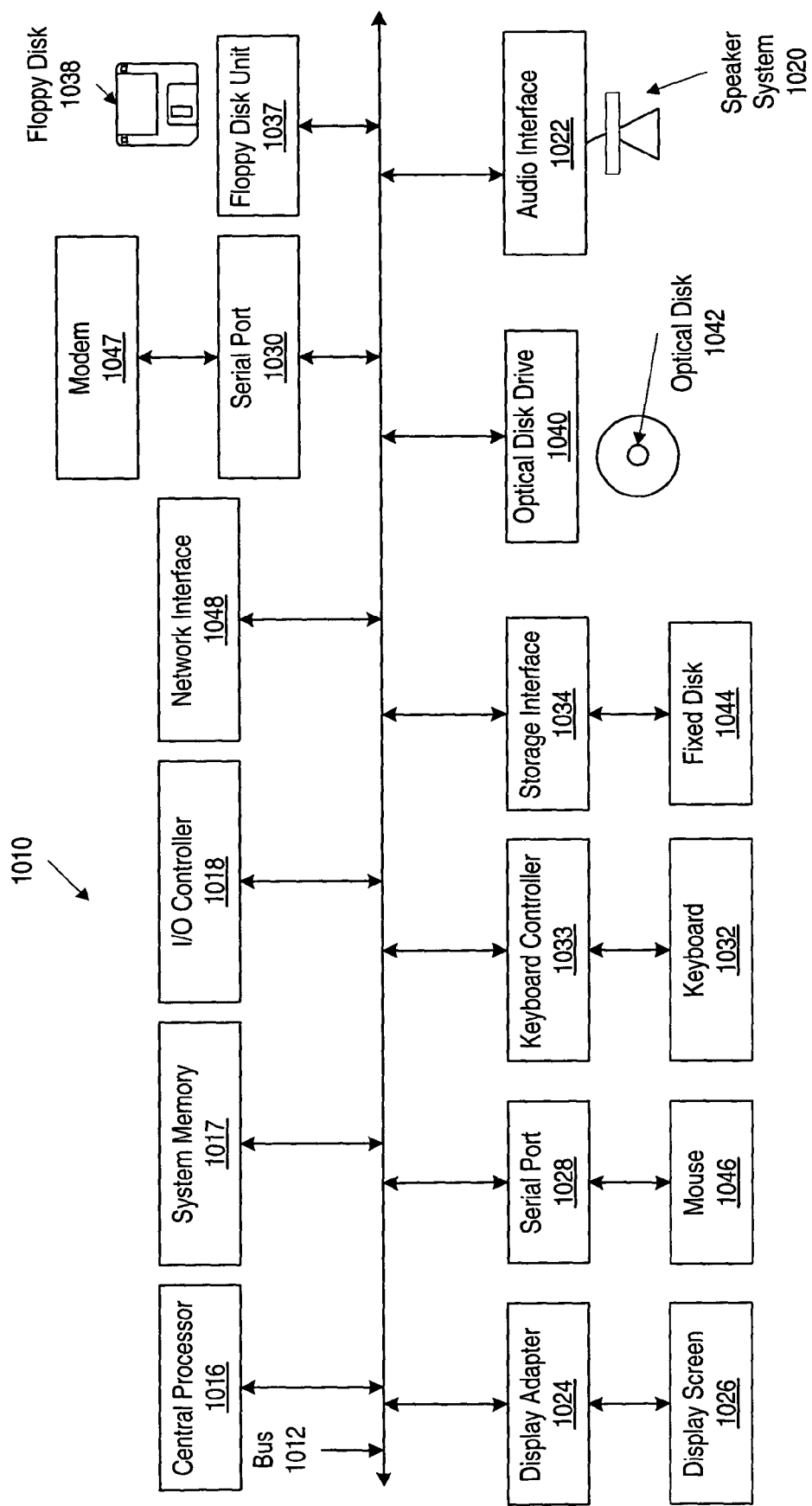
FIG. 10 is a block diagram illustrating an example computer system suitable for implementing the present invention.

FIG. 10 depicts a block diagram of a computer system 1010 suitable for implementing a virtual loader according to the present invention. Computer system 810 includes a bus 812 which interconnects major subsystems of computer system 810. These major subsystems can include, for example: a central processor 816; a system memory 817, typically RAM, but which may also include ROM, flash RAM, or the like; an input/output (I/O) controller 818; an external audio device, such as a speaker system 820 via an audio output interface 822; an external device, such as a display screen 824 via display adapter 826; serial ports 828 and 830; a keyboard 832, which is interfaced with a keyboard controller 833; a storage interface 834; a floppy disk unit 837 operative to receive a floppy disk 838; and an optical disk drive 840 operative to receive an optical disk 842. Also typically included are a mouse 1046 or other point-and-click device coupled to bus 1012 via serial port 1028; a modem 1047 coupled to bus 1012 via serial port 1030; and a network interface 1048 coupled directly to bus 1012.

Bus 1012 allows data communication between central processor 1016 and system memory 1017, which may include read-only memory (ROM) or flash memory (neither shown), and random access memory (RAM) (not shown), as previously noted. The RAM is generally the main memory into which the operating system and application programs are loaded and typically affords at least 64 megabytes of memory space. The ROM or flash memory may contain, among other code, the Basic Input-Output system (BIOS) which controls basic hardware operation such as the interaction with peripheral components. Applications resident with computer system 810 are generally stored on and accessed via a computer readable medium, such as a hard-disk drive; a fixed disk 844; an optical drive such as optical disk drive 840; floppy disk unit 837; or other storage medium. Additionally, applications may be in the form of electronic signals modulated in accordance with the application and data communication technology when accessed via network modem 1047 or network interface 1048.

Storage interface 1034, as with the other storage interfaces of computer system 1010, may connect to a standard computer readable medium for storage and/or retrieval of information, such as fixed disk drive 1044. Fixed disk drive 1044 may be a part of computer system 1010 or may be separate and accessed through other interface systems. It will be apparent that a virtual loader of the present invention can be implemented, for example, using a hard-disk drive such as fixed disk 1044. Modem 1047 may provide a direct connection to a remote server via a telephone link or to the Internet via an internet service provider (ISP). Network interface 1048 may provide a direct connection to a remote server via a direct network link to the Internet via a POP (point of presence). Network interface 1048 may provide such connection using wireless techniques, including digital cellular telephone connection, Cellular Digital Packet Data (CDPD) connection, digital satellite data connection or the like.

Many other devices or subsystems, such as bar code readers, document scanners, digital cameras and so on (not shown), may be connected in a similar manner. Conversely, it is not necessary for all of the devices shown in FIG. 10 to be present to practice the present invention. The devices and subsystems may be interconnected in different ways from that shown in FIG. 10. The operation of a computer system such as that shown in FIG. 10 is readily known in the art and is not discussed in detail in this application. Code to implement the present invention may be stored in computer-readable storage media such as one or more of system memory 1017, fixed disk 1044, optical disk 1042, or floppy disk 1038. Additionally, computer system 1010 may be any kind of computing device, and so includes personal data assistants (PDAs), network appliance, X-window terminal or other such computing devices. The operating system provided on computer system 1010 may be MS-DOS®, MS-WINDOWS®, OS/2®, UNIX®, Linux®, or another known operating system. Computer system 1010 also supports a number of Internet access tools, including, for example, an HTTP-compliant web browser having a JavaScript interpreter, such as Netscape Navigator®, Microsoft Explorer®, and the like.

The foregoing described embodiment wherein the different components are contained within different other components, such as the various elements shown as components of computer system 1010). It is to be understood that such depicted architectures are merely examples, and that, in fact, many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

Moreover, regarding the signals described herein, those skilled in the art will recognize that a signal may be directly transmitted from a first block to a second block, or a signal may be modified, for example by being amplified, attenuated, delayed, latched, buffered, inverted, filtered, or otherwise modified, between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved. For example, there will inevitably be some attenuation and delay in such circuitry. Therefore, as used herein, a second signal derived from a first signal includes the first signal or any modifications to the first signal, whether due to circuit limitations or due to passage through other circuit elements which do not change the informational and/or final functional aspect of the first signal.

Figure 11:
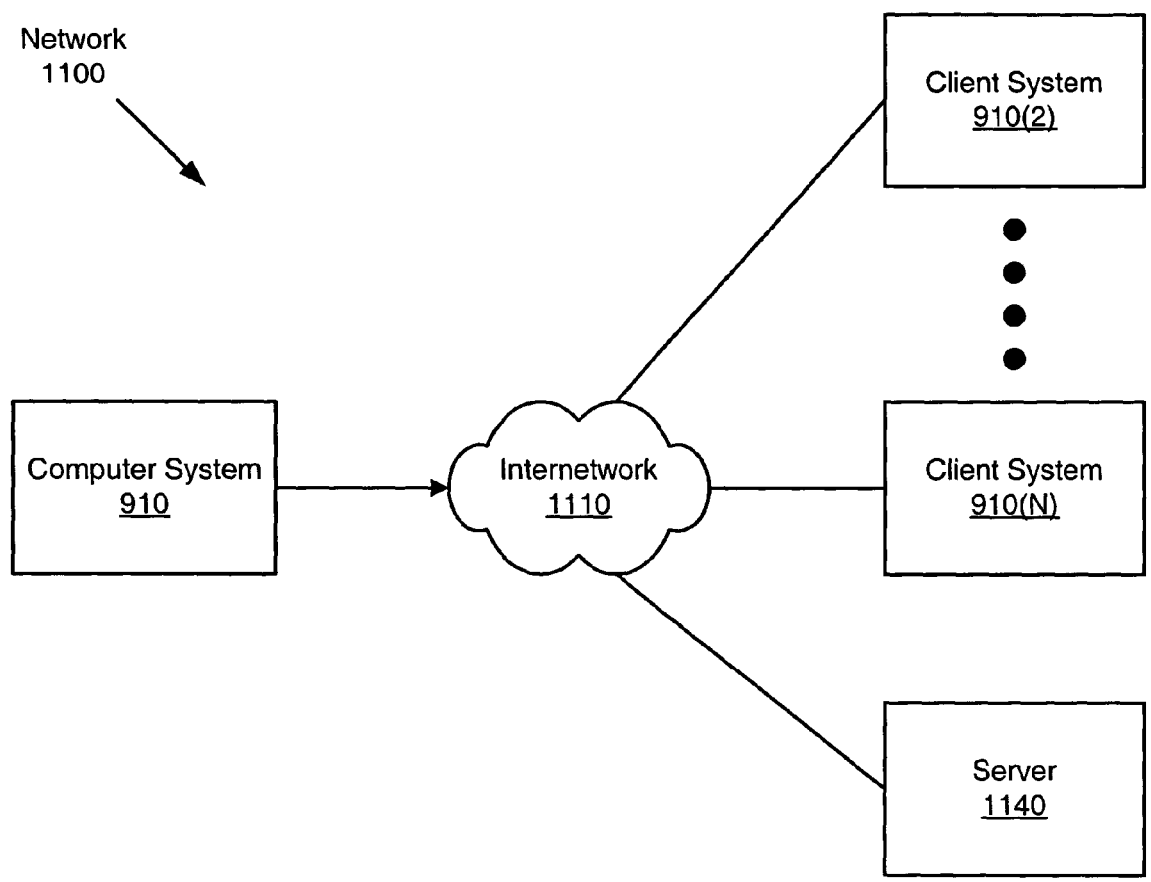
FIG. 11 is a block diagram illustrating a network architecture suitable for implementing the present invention.

FIG. 11 is a block diagram depicting a network architecture 1100 in which client systems 1110(1)-(N), as well as a server 1140 (any of which can be implemented using a computer system such as computer system 1010), are coupled to a network 1130. With reference to computer system 1010, modem 1047, network interface 1048 or some other method can be used to provide connectivity from each of client computer systems 1110(1)-(N) to network 1130. Client systems 1110(1)-(N) are able to access information on server 1120 using, for example, a web browser or other client software (not shown). Such a client allows client systems 1110(1)-(N) to access data hosted by server 1120. FIG. 11 depicts the use of a network such as the Internet for exchanging data, but the present invention is not limited to the Internet or any particular network-based environment.

Referring to FIGS. 10 and 11, a browser running on computer system 1010 employs a TCP/IP connection to pass a request to server 1140. Such a browser can run, for example, an HTTP "service" or a "daemon". Such a request can be processed, for example, by contacting an HTTP server employing a protocol that can be used to communicate between the HTTP server and the client computer. The HTTP server then responds to the protocol, typically by sending a "web page" formatted as an HTML file. The browser interprets the HTML file and may form a visual representation of the same using local resources.

It will be noted that the variable identifier "N" is used in several instances in FIG. 11 to more simply designate the final element of a series of related or similar elements. The repeated use of such variable identifiers is not meant to imply a correlation between the sizes of such series of elements, although such correlation may exist. The use of such variable identifiers does not require that each series of elements has the same number of elements as another series delimited by the same variable identifier. Rather, in each instance of use, the variable identified by "N" may hold the same or a different value than other instances of the same variable identifier.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Moreover, while the invention has been particularly shown and described with reference to these specific embodiments, it will be understood by those skilled in the art that the foregoing and other changes in the form and details may be made therein without departing from the spirit or scope of the invention.

What is claimed is:

1. A method comprising:
    receiving, at a client computer in response to a request for a web page, data associated with at least one user-defined preference, previously specified by a user said data comprising display information and operational information, said data not required for a server-based application corresponding to the web page, and said user-defined preference unique to each user;
    receiving, at said client computer, a script defining a control, said control including a display function and an operational function based on said data;
    configuring said operational function of said control to perform according to said operational information based on said data; and
    controlling the performance of said operational function in accordance to said operational information using at least a portion of said data; and
    wherein said control modifies an instantiation of the server-based application by providing a modified web page in accordance with the user-defined preference instead of the web page requested.

2. The method of claim 1, wherein said at least a portion of said data comprises server-based preferences.

3. The method of claim 2, further comprising:
    creating client-based preferences by storing said at least a portion of said data in a local data cache.

4. The method of claim 1, wherein said display function comprises:
    presenting another portion of said data.

5. The method of claim 1, wherein said display function comprises:
    presenting said data in accordance to said display information based on said data.

6. The method of claim 5, further comprising:
    receiving content, wherein said content comprises said script, and said script comprises said data.

7. The method of claim 6, wherein said content is an HTML, document, said HTML document comprises a field, said data comprises a plurality of selections, and said presenting presents said selections as alternative entries for said field.

8. The method of claim 1, wherein said data and said script are received from a server.

9. The method of claim 8, further comprising:
    receiving content, wherein said content comprises said script, and said script comprises said data.

10. The method of claim 9, further comprising:
    storing said data in a local data cache.

11. A computer system comprising:
    a processor;
    computer readable storage medium coupled to said processor; and
    computer code, encoded in said computer readable storage medium, configured to cause said processor to:
    receive at a client, data associated with at least one user-defined preference, previously specified by a user, in response to a request for a web page, wherein said data comprises display information and operational information, said data not required for a server-based application, and said user-defined preference is unique to each user;

receive, at said client, a script defining a control, and said control including a display function and an operational function based on said data;

configure said operational function of said control to perform in accordance to said operational information based on at least a portion of said data; and control the performance of said operational function in accordance to said operational information using at least a portion of said data;

wherein said control modifies an instantiation of the server-based application by providing a modified web page in accordance with the user-defined preference instead of the web page requested.

12. The computer system of claim 11, wherein said at least a portion of said data comprises server-based preferences.

13. The computer system of claim 12, wherein said computer code is further configured to cause said processor to:
create client-based preferences by storing said at least a portion of said data in a local data cache.

14. The computer system of claim 11, wherein said display function comprises:
presenting another portion of said data in accordance to said display information based on said data.

15. The computer system of claim 11, wherein said display function comprises:
presenting said data in accordance to said display information based on said data.

16. The computer system of claim 15, wherein said computer code is further configured to cause said processor to:
receive content, wherein said content comprises said script, and said script comprises said data.

17. The computer system of claim 16, wherein said content is an HTML document, said HTML document comprises a field, said data comprises a plurality of selections, and said presenting presents said selections as alternative entries for said field.

18. The computer system of claim 11, wherein said data and said script are received from a server.

19. The computer system of claim 18, wherein said computer code is further configured to cause said processor to:
receive content, wherein said content comprises said script, and said script comprises said data.

20. The computer system of claim 19, wherein said computer code is further configured to cause said processor to:
store said data in a local data cache.

21. A tangible computer readable storage medium comprising computer-executable instructions executed by a computer system, said computer-executable instructions comprising:
a first set of instructions, executable on said computer system, configured to receive at a client, data associated with at least one user-defined preference, previously specified by a user, in response to a request for a web page, wherein said data comprises display information and operational information, said data not required for a server-based application, and said user-defined preference is unique to each user;
a second set of instructions, executable on said computer system, configured to receive, at said client, a script defining a control, said control including a display function and an operational function based on said data, and said control is provided to said user at said client;
a third set of instructions, executable on said computer system, configured to configure said operational function of said control to perform in accordance to said operational information based on said data; and
a fourth set of instructions, executable on said computer system, configured to control the performance of said operational function in accordance to said operational information using at least a portion of said data;
wherein said control modifies an instantiation of the server-based application including providing at said client a modified web page, in accordance with the user-defined preference instead of the web page requested.

22. The computer readable storage medium of claim 21, wherein said at least a portion of said data comprises server-based preferences.

23. The computer readable storage medium of claim 22, said computer-executable instructions further comprising:
a fifth set of instructions, executable on said computer system, configured to create client-based preferences by storing said at least a portion of said data in a local data cache.

24. The computer readable storage medium of claim 21, wherein said display function comprises:
presenting another portion of said data in accordance with said display information based on said data.

25. The computer readable storage medium of claim 21, wherein said operational information comprises:
presenting said data.

26. The computer readable storage medium of claim 25, said computer-executable instructions further comprising:
a fifth set of instructions, executable on said computer system, configured to receive content, wherein said content comprises said script, and said script comprises said data.

27. The computer readable storage medium of claim 26, wherein said content is an HTML document, said HTML, document comprises a field, said data comprises a plurality of selections, and said presenting presents said selections as alternative entries for said field.

28. The computer readable storage medium of claim 21, wherein said data and said script are received from a server.

29. The computer readable storage medium of claim 28, said computer-executable instructions further comprising:
a fifth set of instructions, executable on said computer system, configured to receive said control.

30. The computer readable storage medium of claim 29, said computer-executable instructions further comprising:
a sixth set of instructions, executable on said computer system, configured to receive content, wherein said content comprises said script, and said script comprises said data.

31. The computer readable storage medium of claim 30, said computer-executable instructions further comprising:
a seventh set of instructions, executable on said computer system, configured to store said data in a local data cache.

32. An apparatus comprising:
means for receiving at a client data associated with at least one user-defined preference, previously specified by a user, in response to a request for a web page, wherein said data includes display information and operational information, said data is not required for a server-based application, and said user-defined preference is unique to each user;
means for receiving a script at said client, wherein said script defines a control, and said control includes a display function and an operational function based on said data;

means for configuring said operational function of said control to perform in accordance to said operational information based on said data; and means for controlling the performance of said operational function in accordance to said operational information using at least a portion of said data;

wherein said control modifies an instantiation of the server-based application including providing a modified web page in accordance with the user-defined preference instead of the web page requested.

33. The apparatus of claim 32, wherein said at least a portion of said data comprises server-based preferences.

34. The apparatus of claim 33, further comprising:
means for creating client-based preferences by storing said at least a portion of said data in a local data cache.

35. The apparatus of claim 32, wherein said display function comprises:
presenting another portion of said data in accordance with said display information based on said data.

36. The apparatus of claim 32, wherein said display function comprises:
presenting said data in accordance with said display information based on said data.

37. The apparatus of claim 36, further comprising:
means for receiving content, wherein said content comprises said script, and said script comprises said data.

38. The apparatus of claim 37, wherein said content is an HTML, document, said HTML document comprises a field, said data comprises a plurality of selections, and said presenting presents said selections as alternative entries for said field.

39. The apparatus of claim 32, wherein said data and said script are received from a server.

40. The apparatus of claim 39, further comprising:
means for receiving content, wherein said content comprises said script, and said script comprises said data.

41. The apparatus of claim 40, further comprising:
means for storing said data in a local data cache.

42. A method for facilitating desktop application functionality in a client/server architecture using a server-based application, the method, at a server, comprising:
sending data associated with at least one user-defined preference, previously specified by a user, in response to a request for a web page, wherein said data includes display information and operational information, said data is not required for the server-based application, and said user-defined preference is unique to each user;
sending a script to a client, wherein said script defines a control, said control includes a display function and an operational function based on said data;
configuring said operational function of said control to perform according to said operational information associated with said data; and
controlling the performance of said operational function in accordance to said operational information using at least a portion of said data;
wherein said control modifies an instantiation of the server-based application including providing a modified web page in accordance with the user-defined preference instead of the web page requested.

43. The method of claim 42, further comprising:
presenting another portion of said data.

44. The method of claim 42, wherein said at least a portion of said data comprises server-based preferences.

45. The method of claim 42, further comprising:
serving content, wherein said content comprises said script, and said script comprises said data.

46. The method of claim 45, wherein said content is an HTML document, said HTML document comprises a field, and said data comprises a plurality of selections.

47. The method of claim 46, further comprising:
causing a portion of said data to be presented, wherein said presenting presents said selections as alternative entries for said field.

48. The method of claim 42, wherein said data and said script arc sent by a server.

49. The method of claim 48, further comprising:
sending content, wherein said content comprises said script, and said script comprises said data.

50. A computer system comprising:
a processor;
computer readable storage medium coupled to said processor; and computer code, encoded in said computer readable storage medium, configured to cause said processor to:
send data associated with at least one user-defined preference, previously specified by a user, in response to a request for a web page, wherein said data includes display information and operational information, said data is not required for a server-based application, and said user-defined preference is unique to each user;
send a script to a client, wherein said script defines a control, said control includes a display function and an operational function based on said data;
configure said operational function of said control to perform in accordance to said operational information based on said data; and
control the performance of said operational function in accordance to said operational information using at least a portion of said data;
wherein said control modifies an instantiation of the server-based application including providing a modified web page in accordance with the user-defined preference instead of the web page requested.

51. The computer system of claim 50, wherein said computer code is further configured to cause said processor to:
cause another portion of said data to be presented.

52. The computer system of claim 50, wherein said at least a portion of said data comprises server-based preferences.

53. The computer system of claim 50, wherein said computer code is further configured to cause said processor to:
serve content, wherein said content comprises said script, and said script comprises said data.

54. The computer system of claim 53, wherein said content is an HTML, document, said HTML document comprises a field, and said data comprises a plurality of selections.

55. The computer system of claim 54, wherein said computer code is further configured to cause said processor to:
cause a portion of said data to be presented, wherein said presenting presents said selections as alternative entries for said field.

56. The computer system of claim 50, wherein said data and said script are sent by a server.

57. The computer system of claim 56, wherein said computer code is further configured to cause said processor to:
send content, wherein said content comprises said script, and said script comprises said data.

58. A tangible computer readable storage medium including computer-executable instructions executed by a computer system, said computer-executable instructions comprising:
a first set of instructions, executable by said computer system, configured to send data associated with at least one user-defined preference, previously specified by a user, in response to a request for a web page, wherein said data includes display information and operational information, said data is not required for a server-based application, and said user-defined preference is unique to each user;

a second set of instructions, executable by said computer system, configured to send a script to a client, wherein said script defines a control, said control includes a display function and an operational function based on said data;

a third set of instructions, executable on said computer system, configured to configure said operational function of said control to perform in accordance to said operational information based on said data; and a fourth set of instructions, executable on said computer system, configured to control the performance of said operational function in accordance to said operational information using at least a portion of said data;

wherein said control modifies an instantiation of the server-based application including providing a modified web page in accordance with the user-defined preference instead of the web page requested.

59. The computer readable storage medium of claim 58, said computer-executable instructions further comprising:

a fifth set of instructions, executable on said computer system, configured to cause another portion of said data to be presented.

60. The computer readable storage medium of claim 59, wherein said at least a portion of said data comprises server-based preferences.

61. The computer readable storage medium of claim 58, said computer-executable instructions further comprising:

a fifth set of instructions, executable on said computer system, configured to serve content, wherein said content comprises said script, and said script comprises said data.

62. The computer readable storage medium of claim 61, wherein said content is an HTML document, said HTML document comprises a field, and said data comprises a plurality of selections.

63. The computer readable storage medium of claim 62, said computer-executable instructions further comprising:

a sixth set of instructions, executable on said computer system, configured to cause a portion of said data to be presented, wherein said presenting presents said selections as alternative entries for said field.

64. The computer readable storage medium of claim 58, wherein said data and said script are sent by a server.

65. The computer readable storage medium of claim 64, said computer-executable instructions further comprising:

a fifth set of instructions, executable on said computer system, configured to send said control.

66. The computer readable storage medium of claim 64, said computer-executable instructions further comprising:

a fifth set of instructions, executable on said computer system, configured to send content, wherein said content comprises said script, and said script comprises said data.

67. An apparatus comprising:

means for sending data associated with at least one user-defined preference, previously specified by a user, in response to a request for a web page, wherein said data includes display information and operational information, said data is not required for a server-based application, and said user-defined preference is unique to each user;

means for sending a script to a client, wherein said script defines a control, said control includes a display function and an operational function based on said data;

means for configuring said operational function of said control to perform in accordance to said operational information based on said data; and means for controlling the performance of said operational function in accordance to said operational information using at least a portion of said data;

wherein said control modifies an instantiation of the server-based application including providing a modified web page in accordance with the user-defined preference instead of the web page requested.

68. The apparatus of claim 67, further comprising:

means for causing another portion of said data to be presented.

69. The apparatus of claim 67, wherein said at least a portion of said data comprises server-based preferences.

70. The apparatus of claim 67, further comprising: means for serving content, wherein said content comprises said script, and said script comprises said data.

71. The apparatus of claim 70, wherein said content is an HTML, document, said HTML document comprises a field, and said data comprises a plurality of selections.

72. The apparatus of claim 71, further comprising:

means for causing a portion of said data to be presented, wherein said presenting presents said selections as alternative entries for said field.

73. The apparatus of claim 67, wherein said means for sending said data and said means for sending said script are a server.

74. The apparatus of claim 73, further comprising:

means for sending content, wherein said content comprises said script, and said script comprises said data.

75. A system comprising:

a server computer having at least one processor, wherein said server computer comprises a script server configured to serve a script to a client computer, said server computer is configured to serve data associated with at least one user-defined preference, previously specified by a user, in response to a request for a web page and said script, wherein said data includes display information and operational information, said data is not required for a server-based application, and said user-defined preference is unique to each user, said script defines a control, said control includes a display function and an operational function based on said data, wherein said server is further configured to control the performance of said operational function in accordance to said operational information using at least a portion of said data, wherein said at least a portion of said data comprises server-based preferences, and said control modifies an instantiation of the server-based application including providing a modified web page in accordance with the user-defined preference instead of the web page requested.

76. The system of claim 75, wherein said server computer is further configured to cause another portion of said data to be presented.

77. The system of claim 75, wherein said server computer is further configured to serve content, said content comprises said script, and said script comprises said data.

78. The system of claim 77, wherein said content is an HTML document, said HTML document comprises a field, and said data comprises a plurality of selections.

79. The system of claim 78, further comprising: said server computer is further configured to cause a portion of said data to be presented, wherein said presenting presents said selections as alternative entries for said field.

80. The system of claim 75, further comprising: a client computer, wherein said client computer is configured to receive said data and said script, and to provide said data and said script to an application resident on said client computer, and said control is within said application.

81. The system of claim 80, wherein said control is configured to control said performance in accordance to said operational information using at least a portion of said data.

82. The system of claim 81, wherein said control is configured to causing another portion of said data to be presented.

83. A system comprising:
a client computer having at least one processor, wherein said client computer is configured to receive data associated with at least one user-defined preference, previously specified by a user, in response to a request for a web page and a script and provide a control according to said data, and to provide said data and said script to an application resident on said client computer, wherein said data includes display information and operational information, said data is not required for a server-based application, said user-defined preference is unique to each user, said script defines said control within said application, said control includes a display function and an operational function based on said data, wherein said control is configured to control the performance of said operational function in accordance to said operational information using at least a portion of said data, wherein said at least a portion of said data comprises server-based preferences, and wherein said control modifies an instantiation of the server-based application including providing a modified web page in accordance with the user-defined preference instead of the web page requested.

84. The system of claim 83, wherein said control is configured to cause another portion of said data to be presented.

85. The system of claim 83, wherein said client computer is further configured to receive content, said content comprises said script, and said script comprises said data.

86. The system of claim 85, wherein said content is an HTML document, said HTML, document comprises a field, and said data comprises a plurality of selections.

87. The system of claim 86, wherein said client computer is further configured to present a portion of said data, wherein said presenting presents said selections as alternative entries for said field.

88. The system of claim 83, further comprising:
a server computer, wherein said server computer comprises a script server configured to serve said script, and said server is configured to serve said script to said client computer.

89. The system of claim 88, wherein said server computer is further configured to serve said data to said client computer.

90. The system of claim 89, wherein said server computer is further configured to serve content.

* * * * *